(12) United States Patent
Cai et al.

(10) Patent No.: US 10,425,934 B2
(45) Date of Patent: *Sep. 24, 2019

(54) METHOD AND SYSTEM FOR SIGNALING TRANSMISSION LAYERS FOR SINGLE USER AND MULTI USER MIMO

(71) Applicant: BlackBerry Limited, Waterloo (CA)

(72) Inventors: Zhijun Cai, Ashburn, VA (US); Sean Michael McBeath, Keller, TX (US); Hua Xu, Ottawa (CA); Yongkang Jia, Ottawa (CA); Youn Hyoung Heo, San Jose, CA (US); Andrew Mark Earnshaw, Kanata (CA); Mo-Han Fong, Sunnyvale, CA (US); Robert Mark Harrison, Grapevine, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,570

(22) Filed: Jan. 29, 2018

(65) Prior Publication Data

US 2018/0167922 A1    Jun. 14, 2018

Related U.S. Application Data

(63) Continuation of application No. 14/946,371, filed on Nov. 19, 2015, now Pat. No. 9,883,501, which is a (Continued)

(51) Int. Cl.
*H04L 5/00* (2006.01)
*H04W 72/04* (2009.01)
(Continued)

(52) U.S. Cl.
CPC ........ *H04W 72/042* (2013.01); *H04B 7/0413* (2013.01); *H04L 5/0023* (2013.01);
(Continued)

(58) Field of Classification Search
None
See application file for complete search history.

(56) References Cited

U.S. PATENT DOCUMENTS 8,260,356 B2    9/2012 Nam et al.
8,856,606 B2    10/2014 Lee et al.
(Continued)

FOREIGN PATENT DOCUMENTS

CN        101834642       9/2010

OTHER PUBLICATIONS

InterDigital Communications, LLC: 3GPP TSG RAN WG1 Meeting #52, R1-080777, "Downlink Control Signaling for MU-MIMO," Sorrento, Italy, Feb. 11-15, 2008, 4 pages.
(Continued)

*Primary Examiner* — Robert C Scheibel
(74) *Attorney, Agent, or Firm* — Fish & Richardson P.C.

(57) ABSTRACT

A method and system to signal transmission layers or dedicated reference signal ports to be used in a multiple input multiple output system, the method including providing a downlink control signal containing information for transmission layers or dedicated reference signal ports utilized, the dedicated reference signal ports being associated with the transmission layers; and using the information to demodulate data on each transmission layer.

19 Claims, 11 Drawing Sheets

Related U.S. Application Data continuation of application No. 13/328,772, filed on Dec. 16, 2011, now Pat. No. 9,219,583, which is a continuation of application No. PCT/US2010/038487, filed on Jun. 14, 2010.

(60) Provisional application No. 61/218,705, filed on Jun. 19, 2009.

(51) Int. Cl.
| | |
|---|---|
| *H04B 7/0413* | (2017.01) |
| *H04W 52/14* | (2009.01) |
| *H04B 7/04* | (2017.01) |
| *H04B 7/0452* | (2017.01) |
| *H04B 7/0456* | (2017.01) |

(52) U.S. Cl.
CPC .......... *H04L 5/0048* (2013.01); *H04L 5/0051* (2013.01); *H04L 5/0094* (2013.01); *H04W 72/0466* (2013.01); *H04B 7/0452* (2013.01); *H04B 7/0469* (2013.01); *H04W 52/143* (2013.01)

(56) References Cited

U.S. PATENT DOCUMENTS

| | | | | |
|---|---|---|---|---|
| 2008/0081655 | A1 | 4/2008 | Shin et al. | |
| 2008/0232494 | A1* | 9/2008 | Pan | H04B 7/0426 375/260 |
| 2009/0154607 | A1 | 6/2009 | Lindoff et al. | |
| 2010/0195599 | A1* | 8/2010 | Zhang | H04L 5/0053 370/329 |
| 2010/0323709 | A1* | 12/2010 | Nam | H04L 5/0094 455/450 |
| 2012/0327891 | A1 | 12/2012 | Nam et al. | |
| 2013/0170455 | A1* | 7/2013 | Lee, II | H04L 1/0025 370/329 |
| 2014/0245094 | A1* | 8/2014 | Kotecha | H04L 1/1812 714/748 |
| 2014/0348109 | A1* | 11/2014 | Chen | H04L 5/0023 370/329 |

OTHER PUBLICATIONS

LG Electronics: 3GPP TSG RAN WG1 Meeting #57, R1-092138, "Consideration on MU-MIMO for LTE-Advanced," San Francisco, USA, May 4-8, 2009, 3 pages.
Motorola: 3GPP TSG RAN1 #52, R1-080734, "PHICH Assignment for TDD and FDD E-UTRA," Sorrento, Italy, Feb. 11-15, 2008, 4 pages.
Research in Motion et al: "Further Discussion on Signaling of OM-RS Port for LTE-A MIMO Transmission", 3GPP Draft; R1-100564 (Rim-Signaling OM-RS-PORTS for LTE-A MIMO), 3rd Generation Partnership Project (3GPP), Mobile Competence Centre; 650, Route Des Luciolesl F-069021 Sophia-Antipolis Cedex; France, vol. RAN WG1, No. Valencia, Spain; Jan. 12, 2010, XP050418182.
Research In Motion, UK Limited: "Further Discussion on Signaling of OM-RS Port for LTE-A MIMO Transmission"; 3GPP TSG RAN WG1 Meeting #59bis; R1-100564; Valencia, Spain, Jan. 18-22, 2010; 6 pages.
Samsung: "DL RS Designs for LTE-Advanced" 3GPP TSG RAN WG1 #56bis; R1-091231; Seoul, Korea, Mar. 23-27, 2009; 5 pages.
Samsung: "DL RS Designs for LTE-Advanced", 3GPP Draft; R1-091231 DL RS Designs in LTE-A, 3rd Generation Partnership Project (3GPP), Mobile Competence Centre; 650, Route Des Lucioles; F-06921 Sophia-Antipolis Cedex; France, No. Seoul, Korea; Mar. 18, 2009, Mar. 18, 2009, XP050338845.
Samsung: 3 GPP TSG RAN WG1 #56bis, R1-091231, "DL RS Designs for LTE-Advanced," Seoul, Korea, Mar. 23-27, 2009, 5 pages.
Samsung: 3GPP TSG RAN WG1 Meeting #57, R1-091864, "Further Discussion on Enhanced DL Beam-forming," San Francisco, USA, May 4-8, 2009, 9 pages.
Samsung: 3GPP TSG RAN WG1 Meeting #47bis, R1-070130, "Considerations on codewords to layers mapping for downlink MIMO," Sorrento, Italy, Jan. 15-19, 2007, 8 pages.
TR36.213, "Evolved universal terrestrial radio access (E-UTRA), physical layer procedures", Version 8.6.0 (Mar. 2009).
TR36.814, "Further Advancements for E-UTRA, Physical Layer Aspects", Version 0.4.1 (Feb. 2009).
RP-090359, "Work Item Description for Enhanced DL transmission for LTE", CMCC, Mar. 2009.
Canadian Patent Application No. 2,764,717, Office action dated Feb 22, 2012.
International Preliminary Report on Patentability for PCT/US2010/038487 dated Jan. 5, 2012.
International Search Report for PCT/US2010/038487 dated Dec. 10, 2010.
European Patent Office, Extended European Search Report, App No. 15152412.1-1855, dated May 7, 2015.
Extended European Search Report issued in EP Application No. 15152412.1 dated May 7, 2015; 6 pages.
Korean Intellectual Property Office. "Office Action," issued in connection with Application No. 10-2012-7001465, English translation, dated Nov. 26, 2014, 3 pages.
Korean Intellectual Property Office. "Office Action," issued in connection with Application No. 10-2012-7001465, dated Nov. 26, 2014, 3 pages.
State Intellectual Property Office. "Second Office Action," issued in connection with Application No. 201080027220.3, dated Sep. 24, 2014, 4 pages.
State Intellectual Property Office of China, Chinese Office Action on Chinese Application No. 201080027220.3 dated Mar. 3, 2014, 8 pages.
Japanese Office action, in connection with Japanese Patent Application No. 2012-516159; dated Nov. 7, 2013, 7 pages, (with English Translation).
Extended European Search Report issued in EP Application No. 16168858.5 dated Sep. 22, 2016; 8 pages.
Research in Motion UK Limited; "Further Discussion on Signaling of DM-RS Port for LTE-A MIMO Transmission"; 3GPPTSG RAN WG1 Meeting #59bis; R1-100564; Valencia, Spain, Jan. 18-22, 2010; 6 pages.
IEEE "Part 16: Air Interface for Fixed and Mobile Broadband Wireless Access Systems", Advanced Air Interface (working document) 802.16m-09/0010r2 Jun. 1, 2009; 351 pages.
Nokia, Shkumbin Hamiti; "IEEE 802.16m System Description Document"; IEEE 802.16 Broadband Wireless Access Working Group; May 31, 2009; 183 pages.
IEEE "Part 16: Air Interface for Fixed and Mobile Broadband Wireless Access Systems", Advanced Air Interface (working document) 802.16m-09/0010r1a Mar. 31, 2009; 148 pages.
Communication Pursuant to Article 94(3) EPC issued in EP Application No. 16168858.5 dated Sep. 12, 2018; 4 pages.

* cited by examiner

METHOD AND SYSTEM FOR SIGNALING TRANSMISSION LAYERS FOR SINGLE USER AND MULTI USER MIMO

CROSS-REFERENCE TO RELATED APPLICATION

This application is a continuation of U.S. application Ser. No. 14/946,371, now U.S. Pat. No. 9,883,501, filed on Nov. 19, 2015, which is a continuation of U.S. application Ser. No. 13/328,772, now U.S. Pat. No. 9,219,583, filed on Dec. 16, 2011 which is a bypass continuation application which claims the benefit under 35 U.S.C. § 120 of PCT Patent Application No. PCT/US2010/038487, filed Jun. 14, 2010, entitled "Method and System for Signaling Transmission Layers for Single User and Multi User MIMO," which claims priority to U.S. Provisional Application No. 61/218,705, filed Jun. 19, 2009. These applications include exemplary systems and methods and are incorporated by reference in their entireties.

FIELD OF THE DISCLOSURE

The present disclosure relates to Multiple Input, Multiple Output (MIMO) communication and in particular to dedicated reference signal usage for demodulation data in MIMO systems.

BACKGROUND

In Long Term Evolution (LTE) Release 8 (Rel-8) specifications, Multi User Multiple Input, Multiple Output (MU-MIMO) transmission is supported in downlink transmission by using transmission mode 5 in the physical layer. If MU-MIMO is specified in such transmission mode, a User Equipment (UE) will feedback a Precoding Matrix Indicator (PMI) and Channel Quality Indicator (CQI) to an Evolved Universal Terrestrial Radio Access Network (E-UTRAN) Node B (eNB) and the eNB will schedule two or more UEs together and signal to the UEs the precoding matrices used for transmission. The transmit power to each UE may then be properly scaled to maintain a constant total transmit power and such power scaling factor may also be signaled to the UE.

The UE will use a Common Reference Signal (CRS) for channel estimation. Thus, other than the power scaling, the MU-MIMO scheme under Rel-8 is almost the same as a closed loop Single User MIMO (SU-MIMO) scheme without any special treatment for MU-MIMO.

In LTE Advanced (LTE-A), various features are being considered. Among them are that the reference signal (RS) is defined into two categories, one for Channel Measurement (CSI-RS) and the other for Demodulation (DM-RS). This is different from the Rel-8 specifications, where channel estimation and demodulation all use the same set of common reference signals, the CRS. Furthermore, the DM-RS should be precoded in the same way as for data, making the RS a Dedicated Reference Signal (DRS).

In LTE Rel-9, a work item being investigated is the performance of a dual layer beamforming technique. In such a system, two independent data streams are encoded, modulated and mapped to frequency resources. The data streams are then transmitted on two independent beams from a set of antennas, a subset of which may have low mutual correlation. For example the set of antennas could be an array of half wavelength spaced dual polarized elements or the set could be two panels separated by 4 or more wavelengths, where each panel contains half wavelength spaced elements. DRS is also used for demodulation.

This use of a Dedicated Reference Signal creates problems with regard to control signaling. Efficiency is one design consideration for control channels, since control channel overhead impacts system capacity.

Efficient control signaling schemes have been developed in the area of resource allocation. In particular, in order to allocate one or more of a plurality of radio resources, several signaling schemes have been developed. For example, if there are N radio resources, then a bitmap of length N, where each bit represents one radio resource, can be used to indicate a resource allocation. Alternatively, if there are N radio resources, then a first signaling field can be used to indicate the first radio resource in a resource allocation and a second signaling field can be used to indicate the number of radio resources in the allocation. Efficient signaling is also desirable for DRS.

BRIEF DESCRIPTION OF THE DRAWINGS

The present disclosure will be better understood with reference to the drawings in which.

DETAILED DESCRIPTION

The present disclosure provides a method to signal transmission layers to be used in a multiple input multiple output system comprising: providing a downlink control signal containing information for transmission layers or dedicated reference signal ports utilized, the dedicated reference signal ports being associated with the transmission layers; and using the information to demodulate data on each transmission layer.

The present disclosure further provides a network element configured to signal transmission layers and/or DRS patterns/codes or DRS ports to be used in a multiple input multiple output system comprising: a communications subsystem for providing a downlink control signal containing information for transmission layers and/or DRS patterns/codes or DRS ports utilized.

The present disclosure still further provides a method at a user equipment for utilizing information for transmission layers to be used in a multiple input multiple output system comprising: receiving a downlink control signal containing information for transmission layers or dedicated reference signal ports utilized, the dedicated reference signal ports being associated with the transmission layers; and demodulating a signal based on the information.

The present disclosure still further provides a user equipment configured to use signaling for transmission layers and/or DRS patterns/codes or DRS ports in a multiple input multiple output system comprising: a communications subsystem for receiving a downlink control signal containing information for transmission layers and/or DRS patterns/codes or DRS ports utilized; and a processor for demodulating a signal based on the information for transmission layers and/or DRS patterns/codes or DRS ports utilized.

Figure 1:
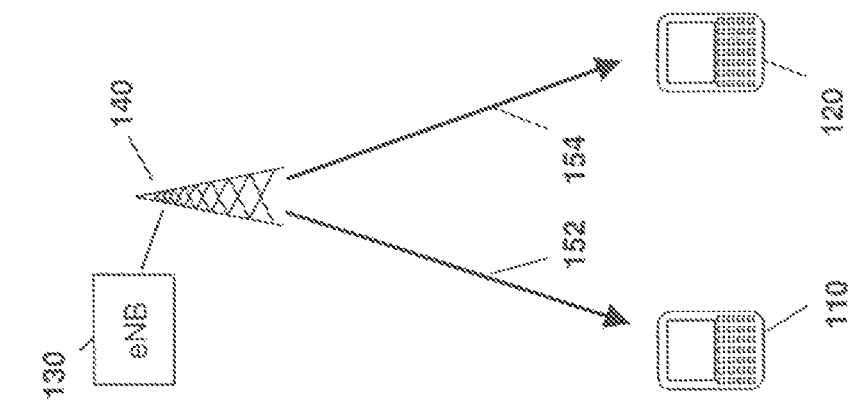
FIG. 1 is a block diagram showing configuration of multi user multiple input multiple output communications in a long term evolution release 8 system.
Figure 1:
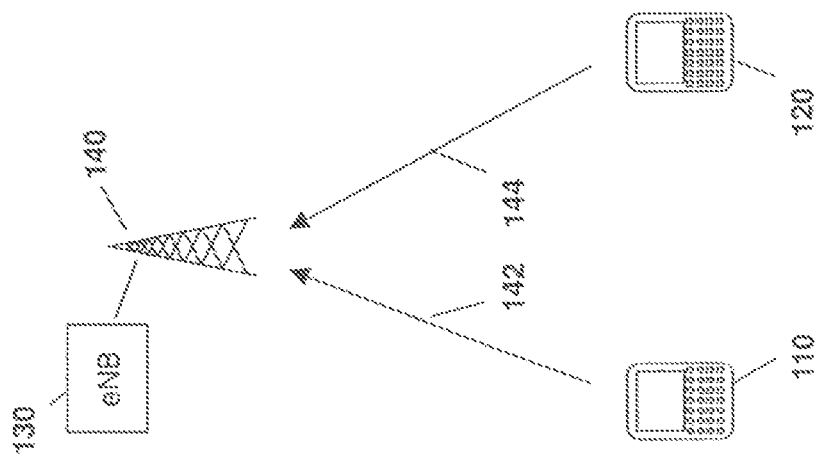

Reference is now made to FIG. 1. As shown in FIG. 1, a Rel-8 Multi-User MIMO transmission is shown. If specified that the UE is in transmission mode 5, the UE provides a precoding matrix indicator (PMI) and channel quality indicator (CQI) to the eNB and the eNB then schedules two or more UEs together and signals to the UEs the precoding matrices used for transmission.

Thus, as seen in FIG. 1, a UE 110 and a UE 120 both provide signals to eNB 130, through a base station 140, with the CQI and PMI, as shown by arrows 142 and 144 respectively.

In response, the eNB 130, through base station 140, pairs the UEs 110 and 120 and starts the MU-MIMO transmission, as shown by arrows 152 and 154.

Conversely, in LTE-A various options exist. Among them are dividing the reference signal into two categories, one for channel measurement and one for demodulation. The reference signals for demodulation are precoded in the same way as the data and thus become dedicated resource signals. One reason for introducing DRS as DM-RS is to control the resource signaling overhead in high order MIMO (where a large number of channels or layers are enabled). In LTE-A, high order MIMO would require more overhead if the common reference signal is used.

The introduction of the DRS for LTE-A may facilitate the use of Multi-User MIMO. Namely, the use of DRS requires no explicit signaling of the power level to the UE since the power level information is carried by the DRS. Also, due to the use of DRS, the eNB could use different precoding matrices other than the one recommended by the UE, and it could even use a precoding matrix not specified in a codebook. The use of such precoding matrices may facilitate interference suppression and cancellation in MU-MIMO. Furthermore, the PMI need not be signaled by the eNB to the UE to save control signal overhead in one embodiment. The use of DRS also allows more flexibility for the MU-MIMO transmission such as layer allocation.

In LTE Rel-9, beamforming techniques and design aspects are considered. In such a system, two independent data streams are encoded, modulated and mapped to frequency resources. The data streams are then transmitted on two independent beams from a set of antenna with cross polarization. DRS is used for demodulation.

Figure 2:
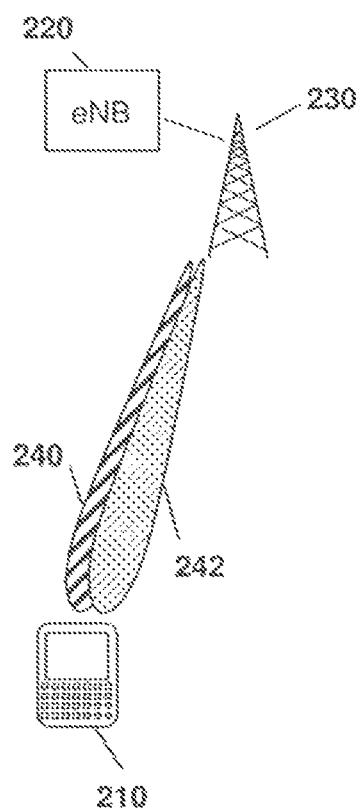
FIG. 2 is a block diagram showing beamforming communication between a base station and a single user.

Reference is now made to FIG. 2. As seen in FIG. 2, a UE 210 communicates with an eNB 220 through a base station 230. In the embodiment of FIG. 2, a single user MIMO has dual layer beamforming, as shown by beams 240 and 242 respectively.

Figure 3:
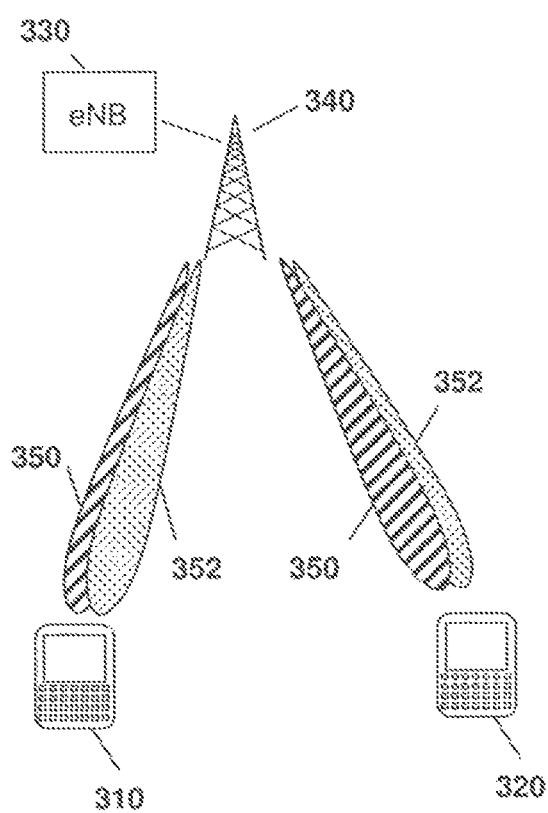
FIG. 3 is a block diagram showing beamforming communication between a base station and multiple users in which the same beams are provided to each user.

Referring to FIG. 3, a UE 310 and UE 320 communicate with an eNB 330 through base station 340. Each UE 310 and 320 receive 2 beams, shown as beams 350 and 352.

Figure 4:
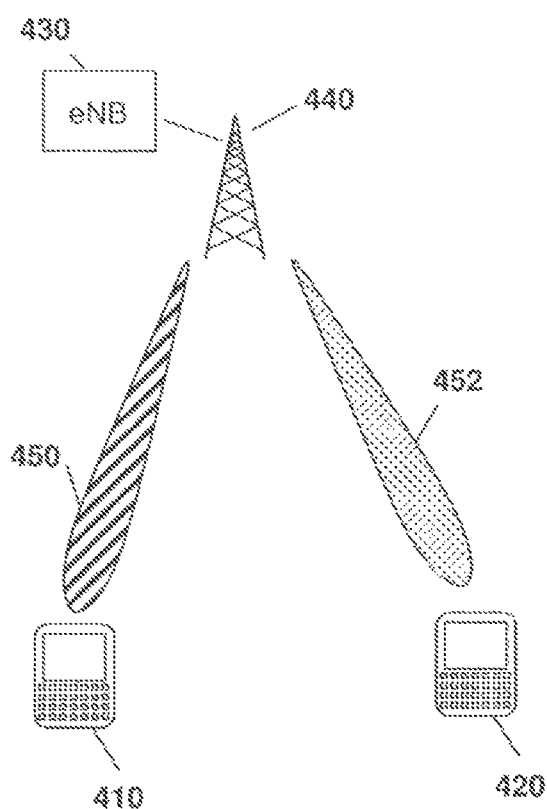
FIG. 4 is a block diagram showing beamforming communication between a base station and multiple users in which separate beams are provided to each user.

Reference is now made to FIG. 4. In FIG. 4, UEs 410 and 420 communicate with an eNB 430 through a base station 440. In the example of FIG. 4, a dual layer beam forming for Multi-User MIMO is provided with different beams. The different beams are shown as beam 450, provided to UE 410, and beam 452, provided to UE 420.

As seen from FIGS. 2, 3 and 4, two independent data streams are modulated and mapped to frequency resources. They are then transmitted on two independent beams from a set of antennas, a subset of which may have low mutual correlation. For example the set of antennas could be an array of half wavelength spaced dual polarized elements or the set could be two panels separated by 4 or more wavelengths, where each panel contains half wavelength spaced elements. DRS is used for demodulation.

FIGS. 2 to 4 show that the system of Rel-9 has the flexibility to support Single User MIMO as well as Multi-User MIMO transmission and can have the flexibility of transmitting to two users, each on a different beam or layer.

The transmission flexibility in Rel-9 and LTE-A requires a corresponding new control signal design to avoid the introduction of too many modes and too many transmission configurations, as the introduction of too many modes and configurations will increase the complexity of both the eNB and UE.

Furthermore, even though Multi-User MIMO may provide performance benefits for Rel-9 and LTE-A, some issues may need to be addressed, other than by using the dedicated reference signals. This is because, unlike using the Single-User MIMO, there is flexibility in Multi-User MIMO configurations and transmissions to be considered in the design of control signaling.

Figure 5:
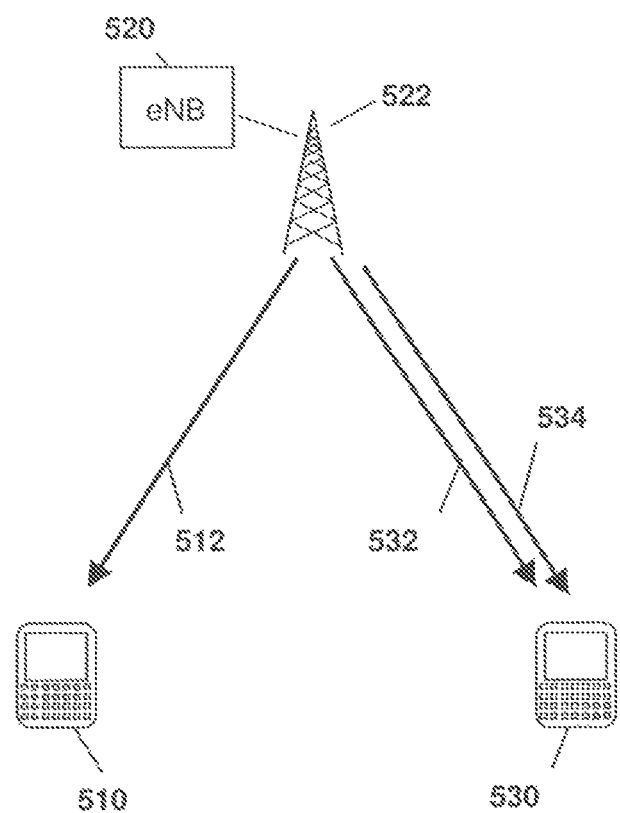
FIG. 5 is a block diagram showing multi user multiple input multiple output communications in which separate layers are provided to different user equipment.
Figure 6:
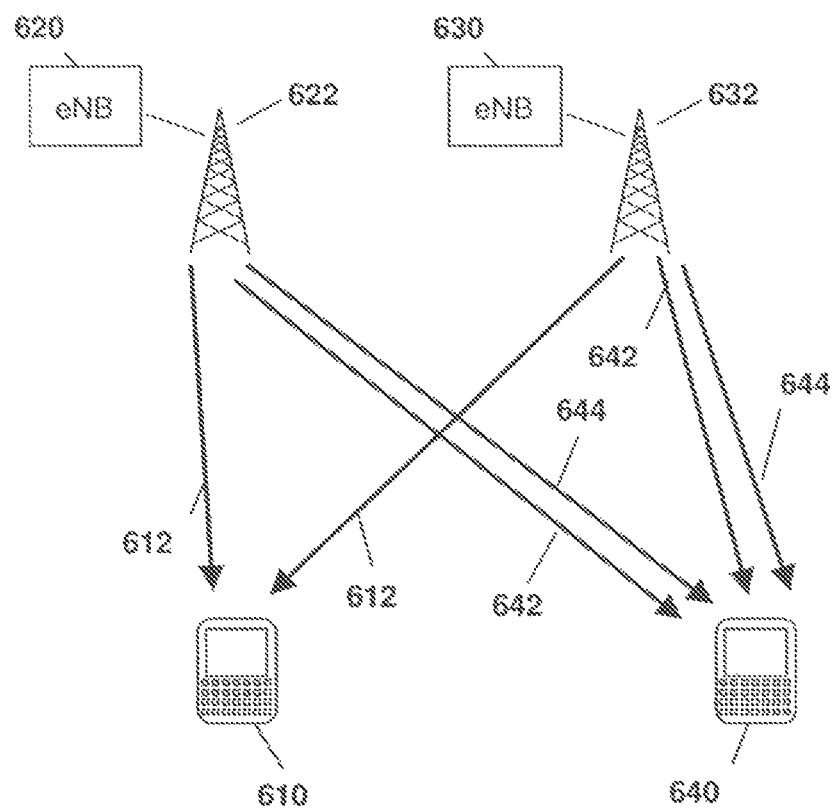
FIG. 6 is a block diagram showing a multi cell implementation of the system of FIG. 5.

Reference is now made to FIGS. 5 and 6. FIGS. 5 and 6 show two examples of Multi-User MIMO transmission in both single cell and multi-cell transmission (CoMP).

Specifically, in FIG. 5, a single cell, multi user MIMO system is provided where various layers are transmitted to different UEs. In particular, in FIG. 5, UE 510 receives a layer 512 from the eNB 520 through a base station 522.

UE 530 receives layers 532 and 534 from the eNB 520.

Referring to FIG. 6 a multi-cell approach is shown in which a UE 610 receives a layer 612 from both eNB 620 and eNB 630 through base stations 622 and 632 respectively.

UE 640 receives beams 642 and 644 from eNB 620 and eNB 630 in the example of FIG. 6.

As will be appreciated, FIGS. 5 and 6 show downlink transmissions, which could mean different layers being transmitted or it could mean actual beams. From the figures, three beams are provided, two being provided to one UE, while the third is However, mixed layer transmission is not supported by current Rel-8 control signaling. This is because the current Rel-8 control signal only contains information of transmit rank (TR), which is enough to support Single User MIMO or Multi-User MIMO whereas CRS is used as the DM-RS. However, for Rel-9 and LTE-A, as DRS is used for MU-MIMO as DM-RS, and DRSs on different layers are orthogonal to each other, rank information is not sufficient for the UE to perform demodulation.

Figure 7:
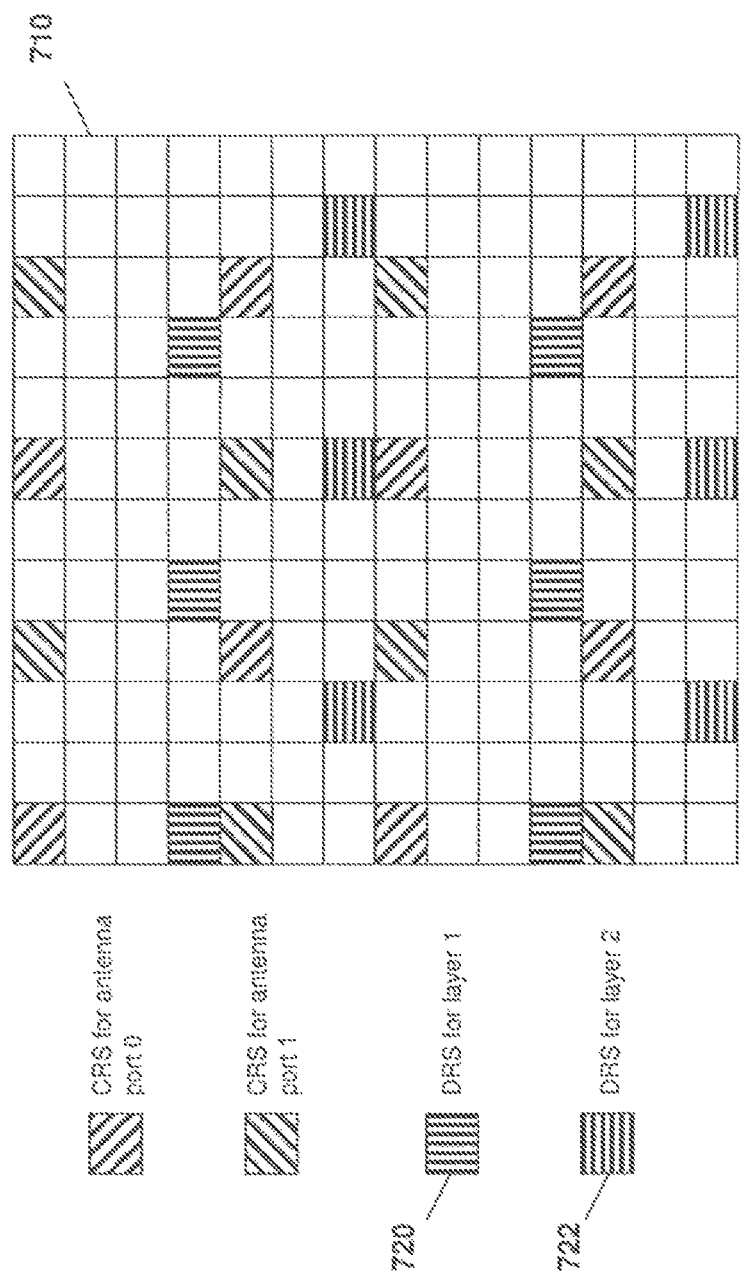
FIG. 7 is a block diagram showing a dedicated reference signal pattern.

Specifically, reference is made to FIG. 7. As shown in FIG. 7, a DRS pattern 710 has two sets of DRS for each layer, namely DRS for layer 1 720 and DRS for layer 2 722. The DRS for layer 1 720 and DRS for layer 2 722 are orthogonal to each other. If the eNB configures the MU-MIMO transmission on 2 UEs, each with a different layer, then simply signaling to the UE the rank-1 transmission is not enough as the UE must also know on which layer it is going to receive the transmission and to use the appropriate DRS for demodulation.

Furthermore, in Rel-8 standards, SU-MIMO and MU-MIMO are two separate transmission modes. However, in LTE-A it may be desirable to have such modes merged into one MIMO mode to support dynamic switching between SU-MIMO and MU-MIMO without awareness of the UE.

Various control signaling options are provided below.

1. Bitmap Approach

In a first embodiment, one way to signal the transmitted layers in downlink control signals is to use a bitmap. Thus, for example, for 2-layer transmission, a 2-bit bitmap could be included in the Downlink Control Information (DCI). A first bit "1" means the corresponding layer is scheduled for transmission, while a bit value of "0" means that the layer is not scheduled for transmission.

Thus, the following bit combinations for a 2-bit bitmap could have the following meanings assuming layer index starting from 0

[1 0]—This means that layer 0 is scheduled for transmission

[0 1]—This means that layer 1 is scheduled for transmission

[1 1]—This means that both layers are scheduled for transmission

Since both in Long Term Evolution (LTE) Rel-9 specifications, and also in LTE-Advanced (LTE-A), each layer has its corresponding dedicated reference signal (DRS) to demodulate the corresponding layer. For Single User MIMO, all the above 3 bit combinations could be used to indicate single-layer transmission or full-rank transmission.

For Multi User MIMO transmission where two users could be scheduled at the same time, if each UE is scheduled to receive on a different layer, then bitmap [1 0] could be signaled to the first UE and bitmap [0 1] could be signaled to the second UE.

As will be appreciated by those skilled in the art, the above bitmap not only contains layer information, it also contains Transmitted Rank (TR) information. Specifically, the bitmap [1 0] simply means a rank-1 transmission is scheduled, while a bitmap of [1 1] means a full rank transmission is scheduled.

In this regard, bitmap signaling not only solves an issue that layer information is missing from the downlink control signal in LTE Rel-8, but also makes SU-MIMO and MU-MIMO transparent to the UE, as the same DCI format could be used for SU-MIMO and MU-MIMO and a UE does not have to be aware if it is in SU-MIMO mode or MU-MIMO mode.

Referring to Table 1 below, Table 1 provides a bitmap method for a 2-layer transmission and summarizes the above.

TABLE 1

| Bitmap method for 2-layer transmission | | |
|---|---|---|
| Layer index (2 bits) | Interpretation | Transmitted Rank (TR) |
| [1 0] | Layer (beam) 0 is transmitted | 1 |

TABLE 1-continued

| Bitmap method for 2-layer transmission | | |
|---|---|---|
| Layer index (2 bits) | Interpretation | Transmitted Rank (TR) |
| [0 1] | Layer (beam) 1 is transmitted | 1 |
| [1 1] | Both layer (beam) are transmitted | 2 |

As seen in Table 1 above, the bitmap corresponds with the layer that is transmitted and also provides the transmitted rank.

For dual-layer Beamforming (BF) schemes for Rel-9, such signaling could be used as well to provide enough flexibility for supporting SU-MIMO and MU-MIMO.

The above 2-bit bitmap is scalable and could be extended for 4-layer transmission or 8-layer transmission.

For 4-layer transmission (also called rank-4 transmission herein) LTE-A, a 4-bit bitmap could be used and some examples of such a bitmap follow.

Specifically:

[1 1 0 0]—Could mean that layers 0 and 1 are scheduled for transmission, with a transmitted rank of 2.

[0 1 0 0]—Means that layer 1 is scheduled for transmission and a transmitted rank of 1.

[1 1 1 1]—Means that all 4 layers are scheduled for transmission and a transmission rank of 4 is assigned.

Utilizing the same convention, for 8-layer transmission in LTE-A, an 8-bit bitmap could be used.

The bitmap method, in summary, is used with the number of bits equivalent to the maximum number of layers that could possibly be transmitted. The total number of layers possibly being transmitted would be the same as the total number of virtual transmit antennas in single cell transmission, or total number of combined transmit antennas from different transmit points in Coordinated Multiple Point (CoMP) transmission. Any bit in the bitmap could use values of either 1 or 0, with a value "1" meaning that the corresponding layer will be transmitted to the UE and with the value "0" meaning that the corresponding layer will not be transmitted to the UE. Such bitmap is transmitted and may be associated with the DCI and could vary from subframe to subframe, reflecting the fact that different numbers of layers could be transmitted from subframe to subframe.

In an alternative embodiment, similar to the bitmap approach above, is to utilize the index of layer allocation information. Specifically, in the case of 4 layers there are a total of 15 different combinations. By sorting these 15 combinations in order, the eNB may signal an index value to the UE of 4 bits. In the case of 8 layers, there are a total of 2 exp 8−1=255 different combinations. By sorting them in order, the eNB signals an index value of 8 bits to the UE.

The alternative embodiment is described below with regard to Table 2 which shows an example of an index value that is passed from the eNB to the UE. The index corresponds with the bitmap shown in Table 2 below, for example.

TABLE 2

| Indices for 4-layer transmission | |
|---|---|
| Index Value | Layer Bitmap |
| 0 | [0 0 0 1] |
| 1 | [0 0 1 0] |

TABLE 2-continued

Indices for 4-layer transmission

| Index Value | Layer Bitmap |
|---|---|
| 2 | [0 1 0 0] |
| 3 | [1 0 0 0] |
| 4 | [0 0 1 1] |
| 5 | [0 1 0 1] |
| 6 | [1 0 0 1] |
| 7 | [0 1 1 0] |
| 8 | [1 0 1 0] |
| 9 | [1 1 0 0] |
| 10 | [0 1 1 1] |
| 11 | [1 0 1 1] |
| 12 | [1 1 0 1] |
| 13 | [1 1 1 0] |
| 14 | [1 1 1 1] |

In yet a further possible embodiment, a field may be composed of two parts. The first part is a subset indicator, while the second field is the index of the element in the subset. For example, if we divide all combinations into 2 sets, one for SU-MIMO and the other for MU-MIMO, then the first subset indicator is 1-bit. That is, if the first subset indicator is a "0", it is for SU-MIMO subsets. Otherwise it is MU-MIMO subsets. Such subset indicator could be implicitly signaled by other parameters which indicates the SU-MIMO and MU-MIMO transmission. Assuming there are a total of 4 layers, the second field for the SU-MIMO subset is a 2 bit element index. The second field for the MU-MIMO subset could be a 3-bit element index. Thus, an extra padding bit could be added to the SU-MIMO element index to align its DCI format with that of the MU-MIMO if a unified DCI format is desired.

In particular, the use of an indicator bit with a subset is illustrated below.

TABLE 3

Subset indicator for 4-layer transmission

| Subset Indicator | Element Index | Layer Bitmap | Definition |
|---|---|---|---|
| [0] | 0 | [1 0 0 0] | SU-MIMO - Layer 0 |
| [0] | 1 | [1 1 0 0] | SU-MIMO - Layer 0 and 1 |
| [0] | 2 | [1 1 1 0] | SU MIMO - Layer 0, 1 and 2 |
| [0] | 3 | [1 1 1 1] | SU MIMO - Layer 0, 1, 2 and 3 |
| [1] | 0 | [1 0 0 0] | MU-MIMO - layer 0 |
| [1] | 1 | [0 1 0 0] | MU-MIMO - layer 1 |
| [1] | 2 | [0 0 1 0] | MU-MIMO - layer 2 |
| [1] | 3 | [0 0 0 1] | MU-MIMO - layer 3 |
| [1] | 4 | [1 1 0 0] | MU-MIMO - layers 0 and 1 |
| [1] | 5 | [0 0 1 1] | MU-MIMO - layers 2 and 3 |
| [1] | 6 | [1 1 1 0] | MU-MIMO - layers 0, 1 and 2 |
| [1] | 7 | [1 1 1 1] | MU-MIMO - layers 0, 1, 2, 3 |

2. Grouping Assignment Approach

The above bitmap approach covers all arbitrary selection, combinations, which may in some instances not be necessary. A simplified alternative to the bitmap approach is to assign the layers to each UE together. For example, if 3 UEs will be assigned with n1, n2, n3 layers, then the first n1 layers could be assigned to the first UE, the next n2 layers could be assigned to the second UE, and the next n3 layers could be assigned to the third UE.

Figure 8:
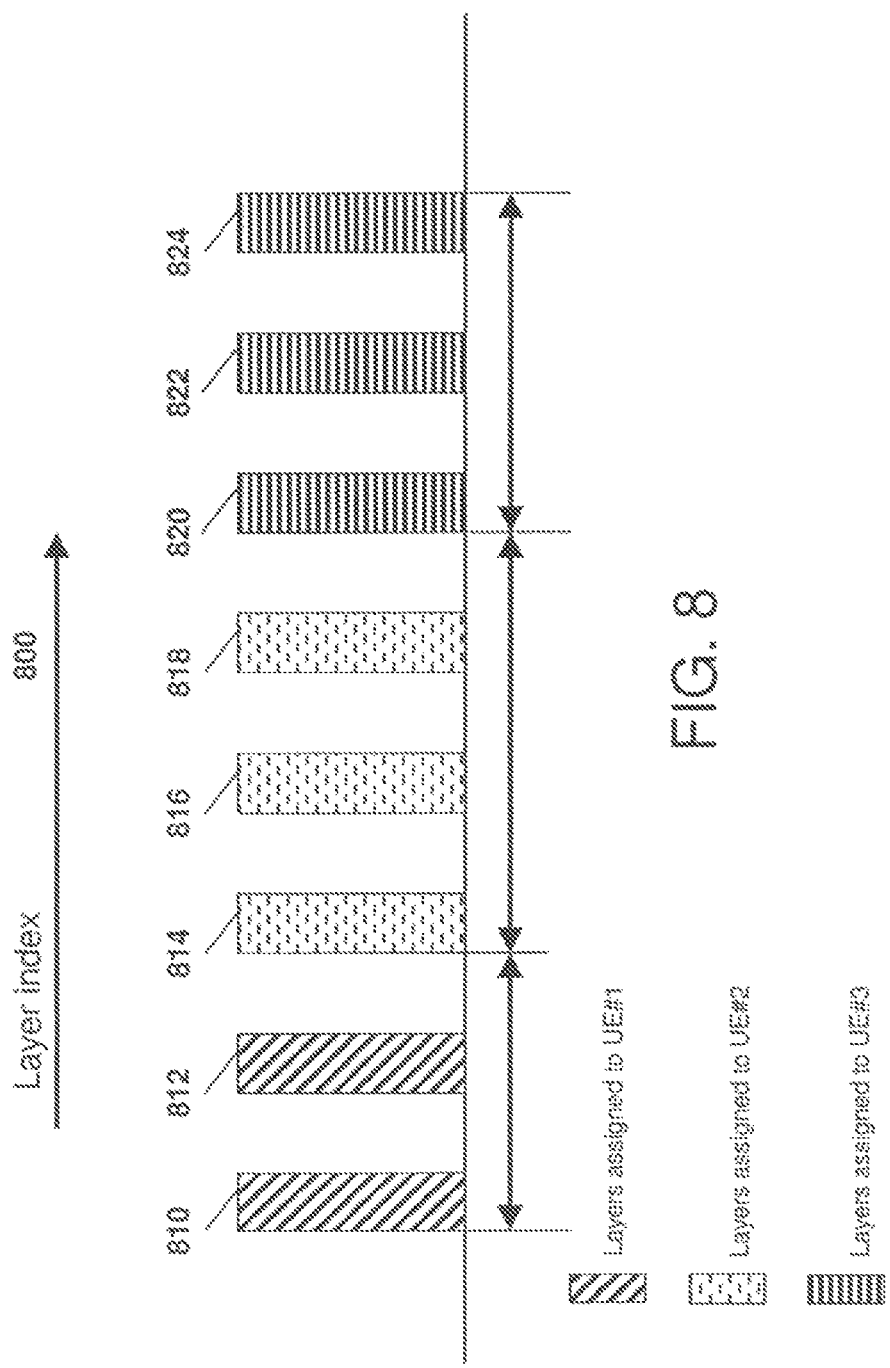
FIG. 8 is a block diagram showing layer assignment grouped for each receiver.

In particular, reference is now made to FIG. 8. In FIG. 8 a layer index for 8 layers is shown. The layer index 800 includes a first layer 810, second layer 812, third layer 814, fourth layer 816, fifth layer 818, sixth layer 820, seventh layer 822 and eighth layer 824.

In the example of FIG. 8, three UEs are transmitting in MU-MIMO. The first UE can be assigned layers 810 and 812, the second UE can be assigned layers 814, 816 and 818, and the third UE can be assigned layers 820, 822 and 824. The allocation of layers which are adjacent to each other to a UE corresponds with the grouping assignment approach.

To signal each assignment, a pair of numbers, denoted by (n,m) could be defined, where n is the index of starting layer for each UE and m is the number of layers assigned to the UE. Thus, in the example of FIG. 8, such pair of numbers for each UE could be derived as follows, assuming that the layer index for layer 810 starts from 0:

UE #1, (0,2)
UE #2, (2,3)
UE #2, (5,3)

Figure 9:
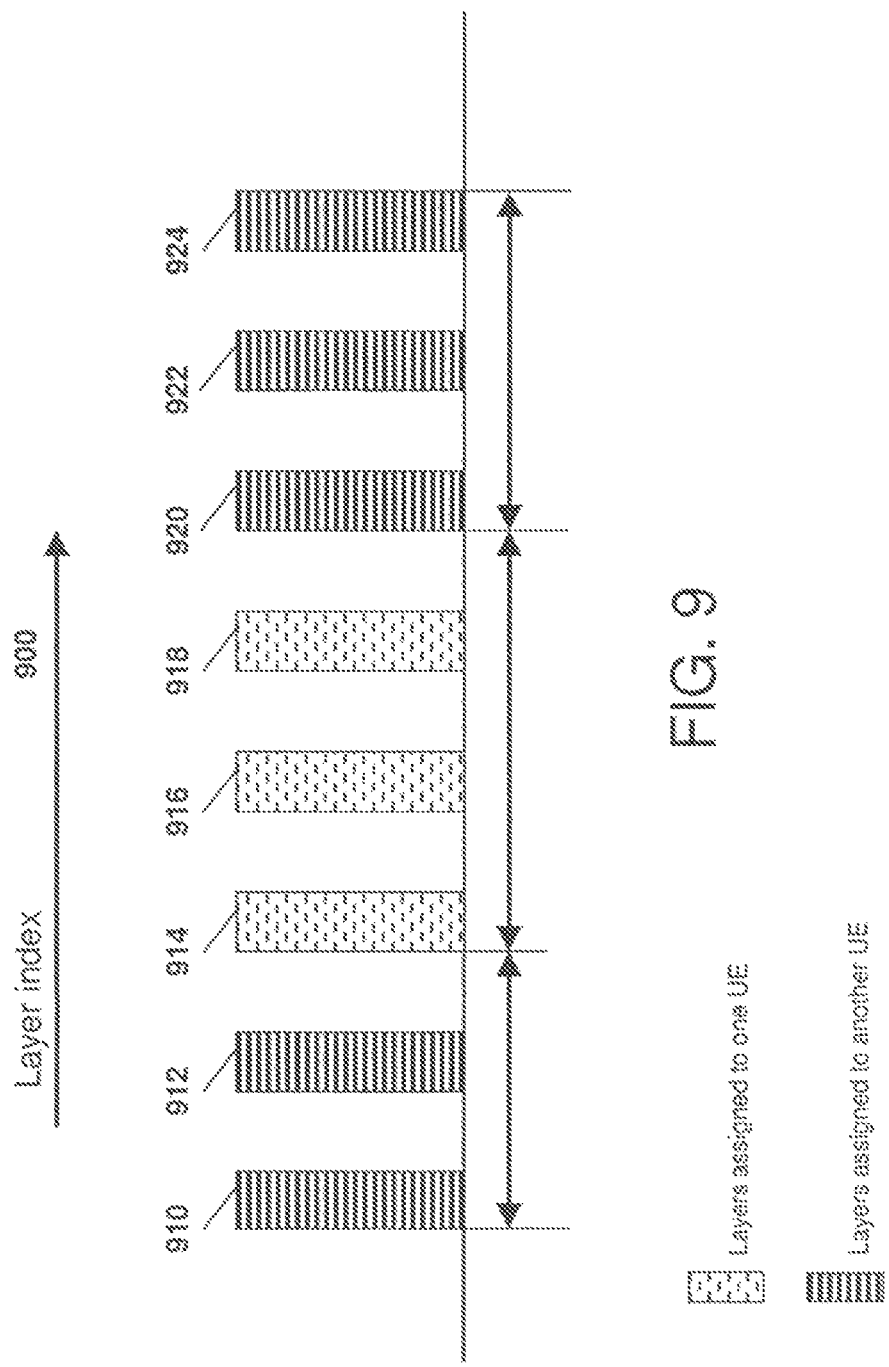
FIG. 9 is a block diagram showing layer assignment grouped for each receiver in which the assignment wraps from a last layer to a first layer.

Furthermore, the assignment could be used in a more generalized wrap-around fashion. Reference is now made to FIG. 9. In FIG. 9, two UEs are assigned, one having 3 layers, and the second having 5 layers. The starting index and number of layers for each UE could be defined as:

UE #1, (2,3)
UE #2, (5,5)

Referring to FIG. 9, layer 910 has a layer index 900 of 0 and the subsequent layers, namely layer 912, layer 914, layer 916, layer 918, layer 920, layer 922 and layer 924 could be assigned. In particular, in accordance with the above, layers 918, 920, 924 are assigned to UE #2. Furthermore, UE #2 has layers 910 and 912 assigned to it since there are 5 layers assigned and the process wraps around 2 layers 910 and 912.

Table 4 below summarizes the signaling bits for such an approach for 4 layer and 8 layer transmissions. As can be seen in the table, for 4 layer transmission there is no overhead reduction for an approach as compared with a bitmap approach. However, for an 8 layer approach, such approach requires 6 signaling bits, which is a 2-bit saving over the bitmap approach.

TABLE 4

Number of signaling bits for grouping assignment approach

| Total number of transmission layers | Bit for index of starting layer "n" | Bit for number of layers for each UE "m" | Total number of signalling bits |
|---|---|---|---|
| 4 | 2 | 2 | 4 |
| 8 | 3 | 3 | 6 |

3. Selected Layer Approach

While the bitmap approach described above is simple and straightforward, it may cover arbitrary layer selection combinations. For cases where the total number of transmission layers is low, such as 3 or 4 layers, using 2-bit or 4-bit bitmaps will not introduce much extra overhead and therefore might be acceptable. However, for the case where the total number of transmission layers is high, for example 8 layers, using an 8-bit bitmap could lead to some concerns regarding control channel overhead. In order to address the concern of overhead, an alternative grouping assignment approach is proposed above which may lead to some overhead reduction for 8 layer transmission.

A further approach is a selected layer approach. The selected layer approach selectively chooses some combinations of layers for the transmission. The selection of such layer combination should be carefully made without missing any typical layer combinations. On the other hand, not every arbitrary layer combination layer is meaningful and therefore leaving out some of the layer combinations should not impact performance.

Selection of layers may be made based on various criteria. Three criteria may be used, for example, may include:
1) All transmission layer hypotheses for SU-MIMO should be included;
2) In addition to the layer hypotheses selected for SU-MIMO, extra layer hypotheses for MU-MIMO could also be added; and
3) When the eNB assigns MU-MIMO transmission, it will assign a UE with the most number of layers first, followed by the UE with the second most number of layers, etc., for example.

Thus, when the eNB assigns two UEs in MU-MIMO, UE #1 having 2 layers and UE #2 having 3 layers, the eNB should assign layers 0 to 2 to UE #2 first followed by assigning layer 3 to 4 to UE #1.

The assignment of the most layers first avoids unnecessary combinations and leads to reduction in the combinations needing to be signaled, thus saving signaling overhead.

An example of layer selection for a 4-layer transmission is illustrated below with regard to Table 5.

TABLE 5

Layer selection for total 4-layer transmission

| Index | Bitmap Indications for layers | Per-UE Transmission Rank | Modes |
|---|---|---|---|
| 0 | [1 0 0 0] | 1 | SU-MIMO/MU-MIMO |
| 1 | [0 1 0 0] | 1 | MU-MIMO |
| 2 | [0 0 1 0] | 1 | MU-MIMO |
| 3 | [0 0 0 1] | 1 | MU-MIMO |
| 4 | [1 1 0 0] | 2 | SU-MIMO/MU-MIMO |
| 5 | [0 0 1 1] | 2 | MU-MIMO |
| 6 | [1 1 1 0] | 3 | SU-MIMO/MU-MIMO |
| 7 | [1 1 1 1] | 4 | SU-MIMO |

Furthermore, for 8-layer transmission, Table 6 provides various combinations.

TABLE 6

Layer selection for total 8-layer transmission

| Index | Bitmap Indications for layers | Per-UE Transmission Rank | Modes |
|---|---|---|---|
| 0 | [1 0 0 0 0 0 0 0] | 1 | SU-MIMO/MU-MIMO |
| 1 | [0 1 0 0 0 0 0 0] | 1 | MU-MIMO |
| 2 | [0 0 1 0 0 0 0 0] | 1 | MU-MIMO |
| 3 | [0 0 0 1 0 0 0 0] | 1 | MU-MIMO |
| 4 | [0 0 0 0 1 0 0 0] | 1 | MU-MIMO |
| 5 | [0 0 0 0 0 1 0 0] | 1 | MU-MIMO |
| 6 | [0 0 0 0 0 0 1 0] | 1 | MU-MIMO |
| 7 | [0 0 0 0 0 0 0 1] | 1 | MU-MIMO |
| 8 | [1 1 0 0 0 0 0 0] | 2 | SU-MIMO/MU-MIMO |
| 9 | [0 0 1 1 0 0 0 0] | 2 | MU-MIMO |
| 10 | [0 0 0 1 1 0 0 0] | 2 | MU-MIMO |
| 11 | [0 0 0 0 1 1 0 0] | 2 | MU-MIMO |
| 12 | [0 0 0 0 0 1 1 0] | 2 | MU-MIMO |
| 13 | [0 0 0 0 0 0 1 1] | 2 | MU-MIMO |
| 14 | [1 1 1 0 0 0 0 0] | 3 | SU-MIMO/MU-MIMO |
| 15 | [0 0 0 1 1 1 0 0] | 3 | MU-MIMO |
| 16 | [0 0 0 0 1 1 1 0] | 3 | MU-MIMO |
| 17 | [0 0 0 0 0 1 1 1] | 3 | MU-MIMO |
| 18 | [1 1 1 1 0 0 0 0] | 4 | SU-MIMO/MU-MIMO |
| 19 | [0 0 0 0 1 1 1 1] | 4 | MU-MIMO |
| 20 | [1 1 1 1 1 0 0 0] | 5 | SU-MIMO/MU-MIMO |
| 21 | [1 1 1 1 1 1 0 0] | 6 | SU-MIMO/MU-MIMO |
| 22 | [1 1 1 1 1 1 1 0] | 7 | SU-MIMO/MU-MIMO |
| 23 | [1 1 1 1 1 1 1 1] | 8 | SU-MIMO |
| 24-31 | | Reserved | |

The above tables show that all possible combinations of layer allocations to multiple UEs can be generated using layer assignments shown in the tables. For example, with a total of 8 layers from Table 6, the following layer assignments would be possible:

0-8 UEs with one spatial layer each;
0-4 UEs with two spatial layers each;
0-2 UEs with three spatial layers each;
0-2 UEs with four spatial layers each;
0-1 UEs with five spatial layers each;
0-1 UEs with six spatial layers each;
0-1 UEs with seven spatial layers each; and
0-1 UEs with eight spatial layers each.

Any combination of the above spatial layers assignments is achievable using a subset of layer assignments given in Table 6 above, providing that the total number of assigned spatial layers adds up to eight or less.

In one embodiment, Table 5 or 6 above could be modified by flipping the bitmap. For example, the bitmap [1 1 1 1 1 0 0] could be flipped to become [0 0 1 1 1 1 1 1], which means that the UE with the most layers could be assigned first starting from the other end of the layer spectrum.

Referring to Tables 5 and 6 above, the bitmap in the second column in the tables indicates which layers are scheduled and which ones are not. Similar to the tables above with regard to the bitmaps, bit "1" means that the corresponding layer is scheduled for transmission, while bit "zero" means that the corresponding layer is not scheduled for transmission. As will be appreciated, all possible layer selections for SU-MIMO are included and further in addition to those selected for SU-MIMO, some addition layer combinations are selected mainly with MU-MIMO transmission in mind. This allows for the selection of a good mix for SU-MIMO and MU-MIMO while keeping the number of selection hypotheses low, but without losing scheduling flexibility.

As would be appreciated by those in the art, Tables 5 and 6 above also provide rank information for information purposes. However, such information may not need to be transmitted to the UE since the UE could derive such information from bitmap indication for the layers (i.e. the total number of bits in the bitmap corresponding to the index).

The left most column provides an index in the table set that transmitted along with the associated DCI. As seen, from Table 5 above, 3 bits are needed to signal the rank-4 transmissions and 5 signaling bits are needed for rank-8 transmissions. This leads to a savings of 1-bit over the bitmap method above for a rank-4 transmission and a savings of 3 bits for a rank-8 transmission as compared with the bitmap method above.

The selected layer combination could be semi-statically configured by RRC signaling which indicates that it could change from time to time, or may be fixed by the specifications for LTE release 9 or LTE-A.

For example, in an 8-layer case, the selection of layer combinations for MU-MIMO may be different for different UEs. Even for the same UE, the selected layer combination is allowed to be changed during an RRC connected state.

4. Selecting Layers with Transport Block Enabling Approach

Signaling from above may further be reduced by utilizing information concerning the number of transport blocks (TB). In particular, release 8 DCI formats 2 and 2A could be modified as a DCI format to carry signaling to indicate layers assigned to a UE. DCI formats 2 and 2A carry information for two transport blocks and transport block disabling information is included in the DCI. As will be appreciated by those in the art, if one transport block is enabled while the second one is disabled, this implies that a maximum rank of 4 is allowed, while if two transport blocks are enabled then a rank>1 transmission is present (i.e. is two transport blocks are enabled, then no rank equals one is allowed).

For signaling purposes 2 tables could be generated.

Referring to Table 7, when one transfer block is enabled, this table may be used and contains transmission combinations for ranks up to four transmissions.

TABLE 7

Transmission layer combination when one TB is enabled

| Index | Bitmap Indications for layers | Per-UE Transmission Rank | Modes |
| --- | --- | --- | --- |
| 0 | [1 0 0 0 0 0 0 0] | 1 | SU-MIMO/MU-MIMO |
| 1 | [0 1 0 0 0 0 0 0] | 1 | MU-MIMO |
| 2 | [0 0 1 0 0 0 0 0] | 1 | MU-MIMO |
| 3 | [0 0 0 1 0 0 0 0] | 1 | MU-MIMO |
| 4 | [0 0 0 0 1 0 0 0] | 1 | MU-MIMO |
| 5 | [0 0 0 0 0 1 0 0] | 1 | MU-MIMO |
| 6 | [0 0 0 0 0 0 1 0] | 1 | MU-MIMO |
| 7 | [0 0 0 0 0 0 0 1] | 1 | MU-MIMO |
| 8 | [1 1 0 0 0 0 0 0] | 2 | SU-MIMO/MU-MIMO |
| 9 | [0 1 1 0 0 0 0 0] | 2 | MU-MIMO |
| 10 | [0 0 1 1 0 0 0 0] | 2 | MU-MIMO |
| 11 | [0 0 0 1 1 0 0 0] | 2 | MU-MIMO |
| 12 | [0 0 0 0 1 1 0 0] | 2 | MU-MIMO |
| 13 | [0 0 0 0 0 1 1 0] | 2 | MU-MIMO |
| 14 | [0 0 0 0 0 0 1 1] | 2 | MU-MIMO |
| 15 | [1 0 0 0 0 0 0 1] | 2 | MU-MIMO |
| 16 | [1 1 1 0 0 0 0 0] | 3 | SU-MIMO/MU-MIMO |
| 17 | [0 1 1 1 0 0 0 0] | 3 | MU-MIMO |
| 18 | [0 0 1 1 1 0 0 0] | 3 | MU-MIMO |
| 19 | [0 0 0 1 1 1 0 0] | 3 | MU-MIMO |
| 20 | [0 0 0 0 1 1 1 0] | 3 | MU-MIMO |
| 21 | [0 0 0 0 0 1 1 1] | 3 | MU-MIMO |
| 22 | [1 0 0 0 0 0 1 1] | 3 | MU-MIMO |
| 23 | [1 1 0 0 0 0 0 1] | 3 | MU-MIMO |
| 24 | [1 1 1 1 0 0 0 0] | 4 | SU-MIMO/MU-MIMO |
| 25 | [0 1 1 1 1 0 0 0] | 4 | MU-MIMO |
| 26 | [0 0 1 1 1 1 0 0] | 4 | MU-MIMO |
| 27 | [0 0 0 1 1 1 1 0] | 4 | MU-MIMO |
| 28 | [0 0 0 0 1 1 1 1] | 4 | MU-MIMO |
| 29 | [1 0 0 0 0 1 1 1] | 4 | MU-MIMO |
| 30 | [1 1 0 0 0 0 1 1] | 4 | MU-MIMO |
| 31 | [1 1 1 0 0 0 0 1] | 4 | MU-MIMO |

As seen from above, the above is limited to a rank of 4 but provides additional combinations to those provided above with regard to Table 6.

If both transport blocks are enabled, Table 8 is used, which contains transport layer combinations for rank >1 transmission. As will be appreciated, if both transport blocks are enabled the rank will be greater than one and therefore the rank of "one" can be excluded from this table.

TABLE 8

Transmission layer combination when both TB are enabled

| Index | Bitmap Indications for layers | Per-UE Transmission Rank | Modes |
| --- | --- | --- | --- |
| 0 | [1 1 0 0 0 0 0 0] | 2 | SU-MIMO/MU-MIMO |
| 1 | [0 1 1 0 0 0 0 0] | 2 | MU-MIMO |
| 2 | [0 0 1 1 0 0 0 0] | 2 | MU-MIMO |
| 3 | [0 0 0 1 1 0 0 0] | 2 | MU-MIMO |
| 4 | [0 0 0 0 1 1 0 0] | 2 | MU-MIMO |
| 5 | [0 0 0 0 0 1 1 0] | 2 | MU-MIMO |
| 6 | [0 0 0 0 0 0 1 1] | 2 | MU-MIMO |
| 7 | [1 0 0 0 0 0 0 1] | 2 | MU-MIMO |
| 8 | [1 1 1 0 0 0 0 0] | 3 | SU-MIMO/MU-MIMO |
| 9 | [0 1 1 1 0 0 0 0] | 3 | MU-MIMO |
| 10 | [0 0 1 1 1 0 0 0] | 3 | MU-MIMO |
| 11 | [0 0 0 1 1 1 0 0] | 3 | MU-MIMO |
| 12 | [0 0 0 0 1 1 1 0] | 3 | MU-MIMO |
| 13 | [0 0 0 0 0 1 1 1] | 3 | MU-MIMO |
| 14 | [1 0 0 0 0 0 1 1] | 3 | MU-MIMO |
| 15 | [1 1 0 0 0 0 0 1] | 3 | MU-MIMO |
| 16 | [1 1 1 1 0 0 0 0] | 4 | SU-MIMO/MU-MIMO |
| 17 | [0 1 1 1 1 0 0 0] | 4 | MU-MIMO |
| 18 | [0 0 1 1 1 1 0 0] | 4 | MU-MIMO |
| 19 | [0 0 0 1 1 1 1 0] | 4 | MU-MIMO |
| 20 | [0 0 0 0 1 1 1 1] | 4 | MU-MIMO |
| 21 | [1 0 0 0 0 1 1 1] | 4 | MU-MIMO |
| 22 | [1 1 0 0 0 0 1 1] | 4 | MU-MIMO |
| 23 | [1 1 1 0 0 0 0 1] | 4 | MU-MIMO |
| 24 | [1 1 1 1 1 0 0 0] | 5 | SU-MIMO/MU-MIMO |
| 25 | [0 1 1 1 1 1 0 0] | 5 | MU-MIMO |
| 26 | [0 0 1 1 1 1 1 0] | 5 | MU-MIMO |
| 27 | [0 0 0 1 1 1 1 1] | 5 | MU-MIMO |
| 28 | [1 1 1 1 1 1 0 0] | 6 | SU-MIMO/MU-MIMO |
| 29 | [1 1 1 1 1 1 1 0] | 7 | SU-MIMO/MU-MIMO |
| 30 | [1 1 1 1 1 1 1 1] | 8 | SU-MIMO/MU-MIMO |
| 31 | Reserved | | |

As both Table 7 and Table 8 contain 32 transmission layer combinations, 5-bit signaling is enough. This is the same signaling as required for the method corresponding with Table 6 above. However, when comparing Table 7 and Table 8 with Table 6, there is additional information for transmission layer combinations which do not exist in Table 6. This is because Table 6 follows a criteria that always assigns the UE in descending order of layers. While such assignment may be fine in many situations, in some scenarios such as Semi-Persistent Scheduling (SPS), reordering layers from sub frame to sub frame to a particular UE may not be possible. The extra layer combinations provided in Table 7 and Table 8 may be beneficial in this case.

The scheme described with reference to Table 7 and Table 8 can be generalized such that a first mapping of a control channel field to a layer indication is used if there is a first number of transport blocks and a second mapping of a control channel field to a layer indication is used if there is a second number of transport blocks. In some embodiments, the control channel field is represented by the same number of bits for these two cases.

5. Additional Signaling if DRS Ports are Total Rank Dependent

The above embodiments use a one one-to-one mapping between layers and DRS patterns/codes or DRS ports, where a DRS port is a DRS pattern/code associated with a transmission layer and a DRS pattern/code indicates the time, frequency, or spreading/scrambling code pattern used to transmit the DRS. However, in some embodiments there could exist scenarios where one-to-one layer to DRS mapping may not exist. For example, the DRS on layer #1 for total transmission rank of 4 may not be the same as DRS on layer #1 for total transmission rank of 8. This may be caused by designs that allow DRS density/patterns on the same layer to be different for different transmission ranks.

In particular, reference is made to FIG. 7 in which various DRS allocations are made for the 2 layers shown in FIG. 7. However, DRS for layer 1 720 takes 6 resource elements (REs) for each layer. Since the patterns are orthogonal, the DRS for layer 2, illustrated by reference numeral 722, must be in different positions. 6 REs are shown for the DRS for layer 2.

As will be appreciated, if 6 REs per layer are utilized for 8 layers, 48 REs in total need to utilized for RS, leaving little room for data.

Thus, in one embodiment, a maximum of 24 REs can be utilized for DRS for the total rank of all layers. Thus, the DRS may utilize only 3 REs per layer for an 8 layer embodiment. Conversely, if 4 layers are provided, 6 REs per layer are provided.

The capping of total number of DRS could lead to density/patterns of DRS on the same layer which varies based on the transmission ranks. When the total transmission layers are low, such as 2 or 4 layers, the DRS patterns or code could be designed such that they would not change with the transmission ranks. This would create a one-to-one mapping between DRS and layer, where the solutions of Tables 3 to 8 could be used.

For the scenarios where the DRS patterns/codes change with the total transmission rank, one solution is to signal the total transmission rank in addition to the layers. This would lead the UE to find the corresponding DRS for demodulation. Such total transmission rank would require 3 bits to signal for 8 total transmission layers. Alternative embodiments could be to signal the total DRS patterns for the transmission, as the total DRS patterns could be different from the total transmission rank. For example, if Code Division Multiplexing (CDM) is used for DRS multiplexing, the total DRS pattern could vary with every second number of ranks. Therefore, rank-3 and rank-4 could share the same DRS patterns while rank-7 and rank-8 could share with the same DRS pattern as well. This makes the total DRS patterns 4, which only requires 2 bits to signal.

5.1. Signaling when Transport Block Enabling is Considered

When one transport block is enabled while the other is disabled, 5 bits are needed for signaling layer combinations. In addition, 2 bits are needed to signal the total rank of 4, requiring 7 bits in total to signal both layer combinations and total transmission rank. When two TB are all enabled, 3 bits are required to signal the total rank to 8. To align the total number of signaling bits with the scenario where one TB is enabled, the layer combinations for rank>1 contained in Table 6 above could be used which, as shown in Table 9 below, requires 4 bits to signal.

TABLE 9

Rank >1 transmission layer combination

| Index | Bitmap Indications for layers | Per-UE Transmission Rank | Modes |
|---|---|---|---|
| 0 | [1 1 0 0 0 0 0 0] | 2 | SU-MIMO/MU-MIMO |
| 1 | [0 0 1 1 0 0 0 0] | 2 | MU-MIMO |
| 2 | [0 0 0 1 1 0 0 0] | 2 | MU-MIMO |
| 3 | [0 0 0 0 1 1 0 0] | 2 | MU-MIMO |
| 4 | [0 0 0 0 0 1 1 0] | 2 | MU-MIMO |
| 5 | [0 0 0 0 0 0 1 1] | 2 | MU-MIMO |
| 6 | [1 1 1 0 0 0 0 0] | 3 | SU-MIMO/MU-MIMO |
| 7 | [0 0 0 1 1 1 0 0] | 3 | MU-MIMO |
| 8 | [0 0 0 0 1 1 1 0] | 3 | MU-MIMO |
| 9 | [0 0 0 0 0 1 1 1] | 3 | MU-MIMO |
| 10 | [1 1 1 1 0 0 0 0] | 4 | SU-MIMO/MU-MIMO |
| 11 | [0 0 0 0 1 1 1 1] | 4 | MU-MIMO |
| 12 | [1 1 1 1 1 0 0 0] | 5 | SU-MIMO/MU-MIMO |
| 13 | [1 1 1 1 1 1 0 0] | 6 | SU-MIMO/MU-MIMO |
| 14 | [1 1 1 1 1 1 1 0] | 7 | SU-MIMO/MU-MIMO |
| 15 | [1 1 1 1 1 1 1 1] | 8 | SU-MIMO |

As seen in Table 9 above, the index for rank >1 transmission layer combinations where both transport blocks are enabled requires a total of 16 indices and thus can be accomplished utilizing 4 bits.

As summarized in Table 10 below, the total required is 7 bits when transport block enabling is considered. In particular, if only one transport block is enabled, 5 bits are required for transmission layer signaling whereas 2 bits are required for transmission rank. Conversely, if both transport blocks are enabled only 4 bits are required for transmission of the layer information while 3 bits are required for the total transmission rank. In both cases, 7 total bits are required.

TABLE 10

Signaling bit when TB enabling information is considered

| TB enabling information | Bits for transmission layer | Bits for total transmission rank | Total signalling bits |
|---|---|---|---|
| One TB is enabled and the other is disabled | 5 | 2 | 7 |
| Both TB are enabled | 4 | 3 | 7 |

5.2. Signaling with Joint Coding of Layer and Rank

An alternative to explicitly signaling total transmission rank which could require up to 3 bits could be to use the joint coding of both rank and layer information. For example, when considering Table 9 above, when both the transport blocks are enabled, 4 bits are needed to signal the transmission layer which leads to a total of 7-bit signaling if 3-bit additional signaling is used for total transmission rank.

Table 11 below, shows an example of a joint coding of rank and layer information. As will be appreciated utilizing the table, 50 combinations are needed, requiring 6 bits for signaling. This further leads to a 1-bit savings over separate coding the rank and layer information, and also leaves 10 fields unused, which could be reserved for other purposes.

TABLE 11

Combined Layer and total transmission rank for 8-layer transmission

| Index | Bitmap Indications for layers | Per UE transmission rank | Total transmission rank | Modes |
|---|---|---|---|---|
| 0 | [1 1 0 0 0 0 0 0] | 2 | 8 | MU-MIMO |
| 1 | [0 0 1 1 0 0 0 0] | 2 | 8 | MU-MIMO |
| 2 | [0 0 0 1 1 0 0 0] | 2 | 8 | MU-MIMO |
| 3 | [0 0 0 0 1 1 0 0] | 2 | 8 | MU-MIMO |
| 4 | [0 0 0 0 0 1 1 0] | 2 | 8 | MU-MIMO |
| 5 | [0 0 0 0 0 0 1 1] | 2 | 8 | MU-MIMO |
| 6 | [1 1 1 0 0 0 0 0] | 3 | 8 | MU-MIMO |
| 7 | [0 0 0 1 1 1 0 0] | 3 | 8 | MU-MIMO |
| 8 | [0 0 0 0 1 1 1 0] | 3 | 8 | MU-MIMO |
| 9 | [0 0 0 0 0 1 1 1] | 3 | 8 | MU-MIMO |
| 10 | [1 1 1 1 0 0 0 0] | 4 | 8 | MU-MIMO |
| 11 | [0 0 0 0 1 1 1 1] | 4 | 8 | MU-MIMO |
| 12 | [1 1 1 1 1 0 0 0] | 5 | 8 | MU-MIMO |
| 13 | [1 1 1 1 1 1 0 0] | 6 | 8 | MU-MIMO |
| 14 | [1 1 1 1 1 1 1 0] | 7 | 8 | MU-MIMO |
| 15 | [1 1 1 1 1 1 1 1] | 8 | 8 | SU-MIMO |
| 16 | [1 1 0 0 0 0 0 x] | 2 | 7 | MU-MIMO |
| 17 | [0 0 1 1 0 0 0 x] | 2 | 7 | MU-MIMO |
| 18 | [0 0 0 1 1 0 0 x] | 2 | 7 | MU-MIMO |
| 19 | [0 0 0 0 1 1 0 x] | 2 | 7 | MU-MIMO |
| 20 | [0 0 0 0 0 1 1 x] | 2 | 7 | MU-MIMO |
| 21 | [1 1 1 0 0 0 0 x] | 3 | 7 | MU-MIMO |
| 22 | [0 0 0 1 1 1 0 x] | 3 | 7 | MU-MIMO |
| 23 | [0 0 0 0 1 1 1 x] | 3 | 7 | MU-MIMO |
| 24 | [1 1 1 1 0 0 0 x] | 4 | 7 | MU-MIMO |
| 25 | [1 1 1 1 1 0 0 x] | 5 | 7 | MU-MIMO |
| 26 | [1 1 1 1 1 1 0 x] | 6 | 7 | MU-MIMO |
| 27 | [1 1 1 1 1 1 1 x] | 7 | 7 | SU-MIMO |
| 28 | [1 1 0 0 0 0 x x] | 2 | 6 | MU-MIMO |
| 29 | [0 0 1 1 0 0 x x] | 2 | 6 | MU-MIMO |
| 30 | [0 0 0 1 1 0 x x] | 2 | 6 | MU-MIMO |
| 31 | [0 0 0 0 1 1 x x] | 2 | 6 | MU-MIMO |
| 32 | [1 1 1 0 0 0 x x] | 3 | 6 | MU-MIMO |
| 33 | [0 0 0 1 1 1 x x] | 3 | 6 | MU-MIMO |
| 34 | [1 1 1 1 0 0 x x] | 4 | 6 | MU-MIMO |
| 35 | [1 1 1 1 1 0 x x] | 5 | 6 | MU-MIMO |
| 36 | [1 1 1 1 1 1 x x] | 6 | 6 | SU-MIMO |
| 37 | [1 1 0 0 0 x x x] | 2 | 5 | MU-MIMO |
| 38 | [0 0 1 1 0 x x x] | 2 | 5 | MU-MIMO |
| 39 | [0 0 0 1 1 x x x] | 2 | 5 | MU-MIMO |
| 40 | [1 1 1 0 0 x x x] | 3 | 5 | MU-MIMO |
| 41 | [1 1 1 1 0 x x x] | 4 | 5 | MU-MIMO |
| 42 | [1 1 1 1 1 x x x] | 5 | 5 | SU-MIMO |
| 43 | [1 1 0 0 x x x x] | 2 | 4 | MU-MIMO |
| 44 | [0 0 1 1 x x x x] | 2 | 4 | MU-MIMO |
| 45 | [1 1 1 0 x x x x] | 3 | 4 | MU-MIMO |
| 46 | [1 1 1 1 x x x x] | 4 | 4 | SU-MIMO |
| 47 | [1 1 0 x x x x x] | 2 | 3 | MU-MIMO |
| 48 | [1 1 1 x x x x x] | 3 | 3 | SU-MIMO |
| 49 | [1 1 x x x x x x] | 2 | 2 | SU-MIMO |
| 50-63 | Reserved | | | |

In Table 11 above, "x" indicates layers not transmitted

Another example as shown in Table 12 below for a total of 2 layer transmission, where 2 bits could be used to signal both layers and total transmission rank.

TABLE 12

Combined Layer and total transmission rank for 2-layer transmission

| Index | Bitmap indication of layers | Per UE transmission rank | Total transmission rank | Mode |
|---|---|---|---|---|
| 0 | [1 x] | 1 | 1 | SU-MIMO |
| 1 | [1 0] | 1 | 2 | MU-MIMO |
| 2 | [0 1] | 1 | 2 | MU-MIMO |
| 3 | [1 1] | 2 | 2 | SU-MIMO |

Again, "x" in the table indicates layers not transmitted

If TB information in Rel-8 DCI format 2/2A is considered, then rank-2 SU-MIMO with bitmap of layers of [1 1] in Table 12 does not need to be signaled and this index could be reserved for other purpose. To be more specific, the following steps could be used to determine the signaling:

If both TB are enabled, no explicit signal is needed as this implies that rank-2 SU-MIMO will be transmitted Else if only one TB is enabled, using signaling in Table 13

As there exists a one-to-one mapping between layer and DRS ports, such signaling could also be used to signal the DRS ports, and in Table 13, $port^0$ and $port^1$ are DRS ports corresponding to layer 0 and 1, respectively.

TABLE 13

Combined Layer and total transmission rank for 2-layer transmission

| Index | Bitmap indication of layers | Total transmission rank | Mode | DRS port |
|---|---|---|---|---|
| 0 | [1 x] | 1 | SU-MIMO | $port^0$ |
| 1 | [1 0] | 2 | MU-MIMO | $port^0$ |
| 2 | [0 1] | 2 | MU-MIMO | $port^1$ |
| 3 | | Reserved | | |

Again, the "x" in the table indicates layers not transmitted

Based on the above, by applying joint coding as shown in the examples, both transmit layers and total transmission rank could be signaled together. It should also be noted that in addition to transmit layer and total transmission rank, the SU-MIMO or MU-MIMO mode information is also signaled.

6. Signaling of DRS Ports

The signaling disclosed above could be viewed as a part of signaling of DRS patterns/codes or DRS ports which are just divided into some intermediate steps of signaling for layers first, being followed by a layer to DRS port mapping as shown below with regard to FIG. 10. Alternatively, such signaling for DRS ports could be worked out directly in a way that signaling could be directly mapped to a DRS port.

Figure 10:
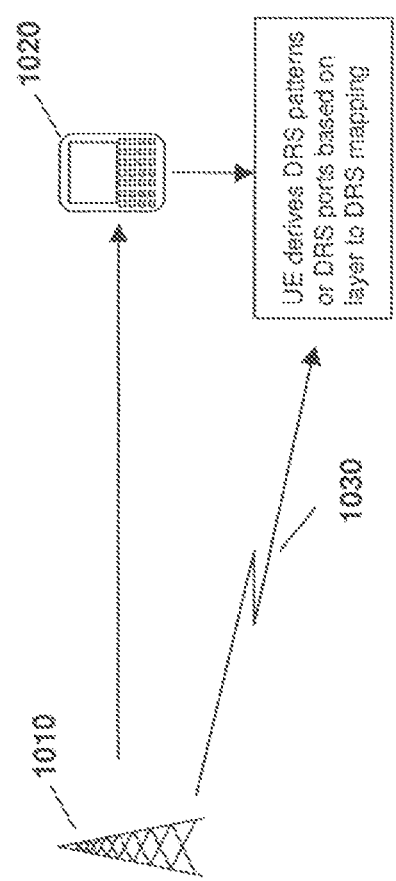
FIG. 10 is a block diagram showing communications between a network element and a user equipment in which dedicated reference signal patterns/codes or ports are derived.

Reference is now made to FIG. 10. In FIG. 10, a base station 1010 communicates with a UE 1020.

The signaling between base station 1010 and UE 1020 provides layer and other information to UE 1020.

As seen with reference numeral 1030, the signaling between the base station 1010 and the UE 1020 is the equivalent to signaling the DRS ports where the UE can derive the DRS ports based on a layer to DRS mapping.

However, if DRS ports are independent of the total transmission rank but only depend on the transmission layer, this may be denoted as DRS $port^n$, where n is the layer index. In this case, there will be total of N DRS antenna ports, $port^n$, n=0, . . . , N−1, where N is the maximum possible transmission layer rank. For such a case, the transmission layer has a one-to-one mapping to the DRS port, and therefore, all layer indices could be viewed as the DRS port indices, and the signaling of the layer index in the above embodiments may be viewed as the signaling of a DRS port index.

If the DRS ports are dependent on both the transmission layer and total transmission rank, then this may be denoted as $port_m^n$, where n is the layer index and m is the total transmission rank. For example, $port_5^3$, refers to a DRS port for transmission layer 3 where the total transmission rank is 5.

Reference is now made to Tables 14 and 15 below. These tables are modified from Tables 6 and 11 above which include DRS ports in the signaling table.

TABLE 14

Signaling table with DRS ports (rank information is separately encoded)

| Index | Bitmap Indications for layers | Per UE transmission rank | Modes | DRS port |
|---|---|---|---|---|
| 0 | [1 0 0 0 0 0 0 0] | 1 | SU-MIMO/ MU-MIMO | $port_m^0$ |
| 1 | [0 1 0 0 0 0 0 0] | 1 | MU-MIMO | $port_m^1$ |
| 2 | [0 0 1 0 0 0 0 0] | 1 | MU-MIMO | $port_m^3$ |
| 3 | [0 0 0 1 0 0 0 0] | 1 | MU-MIMO | . |
| 4 | [0 0 0 0 1 0 0 0] | 1 | MU-MIMO | . |
| 5 | [0 0 0 0 0 1 0 0] | 1 | MU-MIMO | . |
| 6 | [0 0 0 0 0 0 1 0] | 1 | MU-MIMO | |
| 7 | [0 0 0 0 0 0 0 1] | 1 | MU-MIMO | |
| 8 | [1 1 0 0 0 0 0 0] | 2 | SU-MIMO/ MU-MIMO | $port_m^0$, $port_m^1$ |
| 9 | [0 0 1 1 0 0 0 0] | 2 | MU-MIMO | $port_m^2$, $port_m^3$ |

TABLE 15

Signaling table with DRS ports (rank information is jointly encoded)

| Ind. | Bitmap Indications for layers | Per UE transmission rank | Total transmission rank | Modes | DRS port |
|---|---|---|---|---|---|
| 0 | [1 1 0 0 0 0 0 0] | 2 | 8 | MU-MIMO | $port_8^0$, $port_8^1$ |
| 1 | [0 0 1 1 0 0 0 0] | 2 | 8 | MU-MIMO | $port_8^2$, $port_8^3$ |
| 2 | [0 0 0 1 1 0 0 0] | 2 | 8 | MU-MIMO | . |
| 3 | [0 0 0 0 1 1 0 0] | 2 | 8 | MU-MIMO | . |
| 4 | [0 0 0 0 0 1 1 0] | 2 | 8 | MU-MIMO | . |
| 5 | [0 0 0 0 0 0 1 1] | 2 | 8 | MU-MIMO | |
| 6 | [1 1 1 0 0 0 0 0] | 3 | 8 | MU-MIMO | $port_8^0$, $port_8^1$, $port_8^2$ |
| 7 | [0 0 0 1 1 1 0 0] | 3 | 8 | MU-MIMO | . |
| 8 | [0 0 0 0 1 1 1 0] | 3 | 8 | MU-MIMO | . |
| 9 | [0 0 0 0 0 1 1 1] | 3 | 8 | MU-MIMO | . |
| 10 | [1 1 1 1 0 0 0 0] | 4 | 8 | MU-MIMO | |
| 11 | [0 0 0 0 1 1 1 1] | 4 | 8 | MU-MIMO | |
| 12 | [1 1 1 1 1 0 0 0] | 5 | 8 | MU-MIMO | |
| 13 | [1 1 1 1 1 1 0 0] | 6 | 8 | MU-MIMO | |
| 14 | [1 1 1 1 1 1 1 0] | 7 | 8 | MU-MIMO | |
| 15 | [1 1 1 1 1 1 1 1] | 8 | 8 | SU-MIMO | |
| 16 | [1 1 0 0 0 0 0] | 2 | 7 | MU-MIMO | $port_7^0$, $port_7^1$ | conjunction with the DRS ports indication in the table to find the proper DRS port for demodulation.

In Table 15, ranks are jointly encoded with the transmission layer, the rightmost column shows the explicit DRS antenna ports which could be used by the UE for demodulation. In either case, the signaling described above could be viewed as signaling for DRS ports index.

In another example when TB enabling is considered and selected layer combinations are supported for MU-MIMO, the layers and DRS ports could be signaled to the UE as shown in Table 16. In the example of Table 16 the total maximum layers supported in MU-MIMO is 4 and the maximum layers per UE is 2. In this case, 3-bits are needed.

In the example of Table 16, the illustrated DRS ports for MU-MIMO only transmission are meant only as an example, and other DRS ports combination could be used. As for SU-MIMO, up to 8 layers may need to be supported, so 3-bits are needed to indicate the rank.

The signaling design in Table 16 is able to support both MU-MIMO and SU-MIMO transmission without explicitly indicating whether the transimission is SU-MIMO or MU-MIMO. As 8 layers need to be supported for SU-MIMO, 3 bits are needed for signaling, as shown in Table 3 above. However, the embodiment of Table 16 adds no overhead to support both MU-MIMO and SU-MIMO.

In Table 14, the rightmost column shows the DRS antenna ports which could be used by the UE for demodulation. As the total rank information is separately encoded, the UE needs to decode the rank information m and use that in

TABLE 16

Signaling of DRS ports (with total 4 rank in MU-MIMO)

| | If one TB is enabled and other is disabled | | | Both TB are enabled | | |
|---|---|---|---|---|---|---|
| Index | Bit map for layers | DRS ports | Transmission | Bit map for layers | DRS ports | Transmission |
| 0 | [1 0 0 0 0 0 0 0] | $port_8^0$ | SU/MU-MIMO | [1 1 0 0 0 0 0 0] | $port_8^0$, $port_8^1$ | SU/MU-MIMO |
| 1 | [0 1 0 0 0 0 0 0] | $port_8^1$ | MU-MIMO | [0 0 1 1 0 0 0 0] | $port_8^2$, $port_8^3$ | MU-MIMO |
| 2 | [0 0 1 0 0 0 0 0] | $port_8^2$ | MU-MIMO | [1 1 1 0 0 0 0 0] | $port_8^0$, $port_8^1$, $port_8^2$ | SU-MIMO |
| 3 | [0 0 0 1 0 0 0 0] | $port_8^3$ | MU-MIMO | [1 1 1 1 0 0 0 0] | $port_8^0$, ..., $port_8^3$ | SU-MIMO |
| 4 | Reserved | | | [1 1 1 1 1 0 0 0] | $port_8^0$, ..., $port_8^4$ | SU-MIMO |
| 5 | Reserved | | | [1 1 1 1 1 1 0 0] | $port_8^0$, ..., $port_8^5$ | SU-MIMO |

TABLE 16-continued

Signaling of DRS ports (with total 4 rank in MU-MIMO)

| | If one TB is enabled and other is disabled | | | Both TB are enabled | | |
|---|---|---|---|---|---|---|
| Index | Bit map for layers | DRS ports | Transmission | Bit map for layers | DRS ports | Transmission |
| 6 | Reserved | | | [1 1 1 1 1 1 1 0] | $port_8^0, \ldots, port_8^6$ | SU-MIMO |
| 7 | Reserved | | | [1 1 1 1 1 1 1 1] | $port_8^0, \ldots, port_8^7$ | SU-MIMO |

An alternative to the solution of Table 16 is to support two types of DRS ports for MU-MIMO simantaneously, these two types of DRS ports could provide different number of orthogonal DRS ports and tailor different scenarios. As shown in Table 17, DRS ports indicated by * may not be the same as corresponding DRS ports without *. For example, in a CDM/FDM type of DRS design, DRS ports denoted by $port_8^0 \ldots port_8^7$ may have a different walsh code length as $port_8^{0*} \ldots port_8^{3*}$, such as $port_8^0 \ldots port_8^7$ having walsh code length of 2, while $port_8^{0*} \ldots port_8^{3*}$ having walsh code length of 4. The purpose of designing two types of DRS ports would be to tailor different application scenarios of MU-MIMO. For example, when there are large number of users to be scheduled in MU-MIMO, $portport_8^{0*} \ldots port_8^{3*}$ could be used, which has walsh code length of 4, and therefore, could provide 4 orthogonal DRS ports and lead to improved performance. On the other hand, when there are less users to be scheduled in MU-MIMO, whose spatial separation is relatively large, $port_8^0$ and $portport_8^1$ could be used, whose walsh code length is 2, and therefore could provide two orthogonal DRS ports. From Table 17, it can be seen that both types of DRS ports could be signalled without requiring extra overhead and it could be up to the eNB to decide which DRS ports are used.

with the proposed signaling bits, which could signal both the transmission layers or DRS ports and, if needed, the total transmission rank.

For example, if the number of total transmission layers is 8, the signaling bits for PMI could be 6 or more, and the savings on the use of those bits could be used for signaling layer information, which would also require 5 or 6 bits. Such a modified DCI format could be used in Rel-9 or Rel-10 for both SU-MIMO and MU-MIMO.

Generally, at the eNB, the same DCI formatted message may be used to carry different information for a first and second set of UEs. For example a first set of UEs corresponding to Rel-8 UEs and a second set of UEs corresponding to beyond Rel-8 UEs could be used. If the targeted UE is from the first set, then the DCI formatted message will be configured to carry an indication of PMI. If the targeted UE is from the second set, the DCI formatted message will be configured to carry an indication of layers. In some embodiments, the indication of PMI and the indication of layers are represented by the same number of bits.

10. Signaling of DRS for Rank-1 MU-MIMO Transmission

The embodiments described above consider a uniform DCI format for signaling both the SU-MIMO and MU-

TABLE 17

Signaling of two types of DRS ports (with total 4 rank in MU-MIMO)

| | If one TB is enabled and other is disabled | | | Both TB are enabled | | |
|---|---|---|---|---|---|---|
| Index | Bit map for layers | DRS ports | Transmission | Bit map for layers | DRS ports | Transmission |
| 0 | [1 0 0 0 0 0 0 0] | $port_8^0$ | SU/MU-MIMO | [1 1 0 0 0 0 0 0] | $port_8^{0*}, port_8^{1*}$ | SU/MU-MIMO |
| 1 | [1 0 0 0 0 0 0 0] | $port_8^{0*}$ | SU/MU-MIMO | [0 0 1 1 0 0 0 0] | $port_8^{2*}, port_8^{3*}$ | MU-MIMO |
| 2 | [0 1 0 0 0 0 0 0] | $port_8^1$ | MU-MIMO | [1 1 1 0 0 0 0 0] | $port_8^0, port_8^1, port_8^2$ | SU-MIMO |
| 3 | [0 1 0 0 0 0 0 0] | $port_8^{1*}$ | MU-MIMO | [1 1 1 1 0 0 0 0] | $port_8^0, \ldots, port_8^3$ | SU-MIMO |
| 4 | [0 0 1 0 0 0 0 0] | $port_8^{2*}$ | MU-MIMO | [1 1 1 1 1 0 0 0] | $port_8^0, \ldots, port_8^4$ | SU-MIMO |
| 5 | [0 0 0 1 0 0 0 0] | $port_8^{3*}$ | MU-MIMO | [1 1 1 1 1 1 0 0] | $port_8^0, \ldots, port_8^5$ | SU-MIMO |
| 6 | Reserved | | | [1 1 1 1 1 1 1 0] | $port_8^0, \ldots, port_8^6$ | SU-MIMO |
| 7 | Reserved | | | [1 1 1 1 1 1 1 1] | $port_8^0, \ldots, port_8^7$ | SU-MIMO |

9. DCI Format to Carry Signaling

The signaling for the transmission layer could be carried on a new DCI format designed for LTE Rel-9 or Rel-10, or could be carried in a modified Rel-8 DCI format. In the case of a modified Rel-8 DCI format, the formats for 2 or 2A in Rel-8 could be the most suitable DCI formats when a single DCI format covering both SU-MIMO and MU-MIMO is to be received by the UE.

As DRS is used for demodulation in Rel-9 and Rel-10, the transmitted precoding matrix (TPMI) information is not needed in DCI, so the bits that correspond to pre-coding information in these formats could be removed and replaced MIMO transmission. They are flexible and could support all layer transmissions from 1 to 8 layers. However, in certain embodiments, it may be possible to have only rank-1 transmissions that are supported for MU-MIMO. For such deployments, if one of the proposed methods is used for signaling layers or DRS, and if DCI formats similar to those used in 2 or 2A are used, bits such as those corresponding to the 2nd transport block will be wasted. To avoid the potential wastage, a more compact DCI format could be considered which only contains information for one layer. In this case, the UE can be signaled which DRS to use by an N bit long field, where 2 exp N is greater than or equal to the total number of DRS available to the UE.

For example, if 4 DRS are used for a 4 transmit antenna rank-1 MU-MIMO, then each of the 4 UEs would be signaled 2 bits to indicate which one of the 4 DRSs to use. A modified version of DCI format 1D may be used for such rank-1 MU-MIMO transmissions where DRS assignment bits described could replace the TPMI information.

In a further embodiment, such a rank-1 only MU-MIMO could also be used as a fallback mode for a more general high rank MU-MIMO. In such case, the UE could try to detect both modified DCI format 1D for rank-1 MU-MIMO as well as modified DCI formats 2 or 2A for more general high-rank MU-MIMO.

Based on the above, a number of configurations for MU-MIMO transmission could exist. In a first embodiment, a rank-1 only MU-MIMO transmission would be applied using a modified DCI format 1D.

In a further configuration, it would include a high-order MIMO transmission including both SU-MIMO and MU-MIMO, which uses a new DCI format, or a DCI format modified from Rel-8 DCI formats 2 and 2A.

In a third configuration, the rank-1 only MU-MIMO is used as a fallback mode for a more general high-order MIMO transmission mode. Both DCI formats from the above could be transmitted.

High-level signaling could be used to inform the UE of such configuration so that the UE would know what kind of DCI formats it needs to decode.

11. Summary of Embodiments

The signaling bits for each approach are summarized with regard to Table 18 and Table 19 below. Table 18 summarizes the signaling required for 2 and 4 layers. As shown, the methods require more or less the same signaling overhead.

Table 19 summarizes the signaling overhead for 8 layers, where the most signaling overhead is incurred. From Table 19, it can be observed that although the bitmap approach provides the most flexibility, it requires the most signaling bits as well. Alternatives provide group assigned approaches and select layer approaches to reduce the overhead of signaling without losing flexibility. Furthermore, with the help of the transport block enabling information and joint coding of both rank and layer, overall signaling could be reduced even further. Comparing the joint coding method with the bitmap method, the overall signaling bits are almost cut in half.

TABLE 18

Summary of signaling bits for total of 2 and 4 layers

| Methods | Total number of transmission layers | Bits for transmission layer | Bits for total transmission rank | Total bits for signaling |
| --- | --- | --- | --- | --- |
| Bitmaps Approach | 2 | 2 | 1 | 3 |
|  | 4 | 4 | 2 | 6 |
| Group Assignment Approach | 2 | 2 | 1 | 3 |
|  | 4 | 4 | 2 | 6 |
| Selected Layer Approach | 2 | 2 | 1 | 3 |
|  | 4 | 3 | 2 | 5 |

TABLE 19

Summary of signaling bits for total of 8 layers

| Methods | Total number of transmission layers | Bits for transmission layer | Bits for total transmission rank | Total bits for signaling |
| --- | --- | --- | --- | --- |
| Bitmaps Approach | 8 | 8 | 3 | 11 |
| Group Assignment Approach | 8 | 6 | 3 | 9 |
| Selected Layer Approach | 8 | 5 | 3 | 8 |
| Selected Layer with TB Enabling Approach | One TB enabled | 8 | 5 | 2 | 7 |
|  | Two TB enabled with separate coding | 8 | 4 | 3 | 7 |
|  | Two TB enabled with joint coding | 8 |  |  | 6 |

Furthermore, subset selections can be applied to limit the transmission to use only selected layer combinations from the tables. For example, a subset of layer assignments for SU-MIMO can be used when the eNB would like to force the transmission in SU-MIMO mode. In other scenarios, certain layers may be reserved for SPS (Semi-Persistent Scheduling) transmission and therefore, subset selections could avoid the assignment of such layers to the UE. Such subsets could be predefined in signals through broadcast channels or higher layer signals.

In some scenarios, it may be beneficial to use the proposed approaches to signal the layer assignment to a UE in a unified MIMO transmission mode, which could include MU-MIMO and SU-MIMO transmissions and allow dynamic switching between them without awareness by the UE.

Furthermore, in some embodiments, the signaling approaches proposed above could also be used for separate SU-MIMO and MU-MIMO transmission modes, that are explicitly specified semi-statically by higher-layer signaling such as RRC.

The above can be implemented on any user equipment on the receiving side and any network element such as an evolved Node B on the sending side. On the sending side, the network element will generally include a processor, memory and communications subsystem to send the information concerning transport layers utilized.

Figure 11:
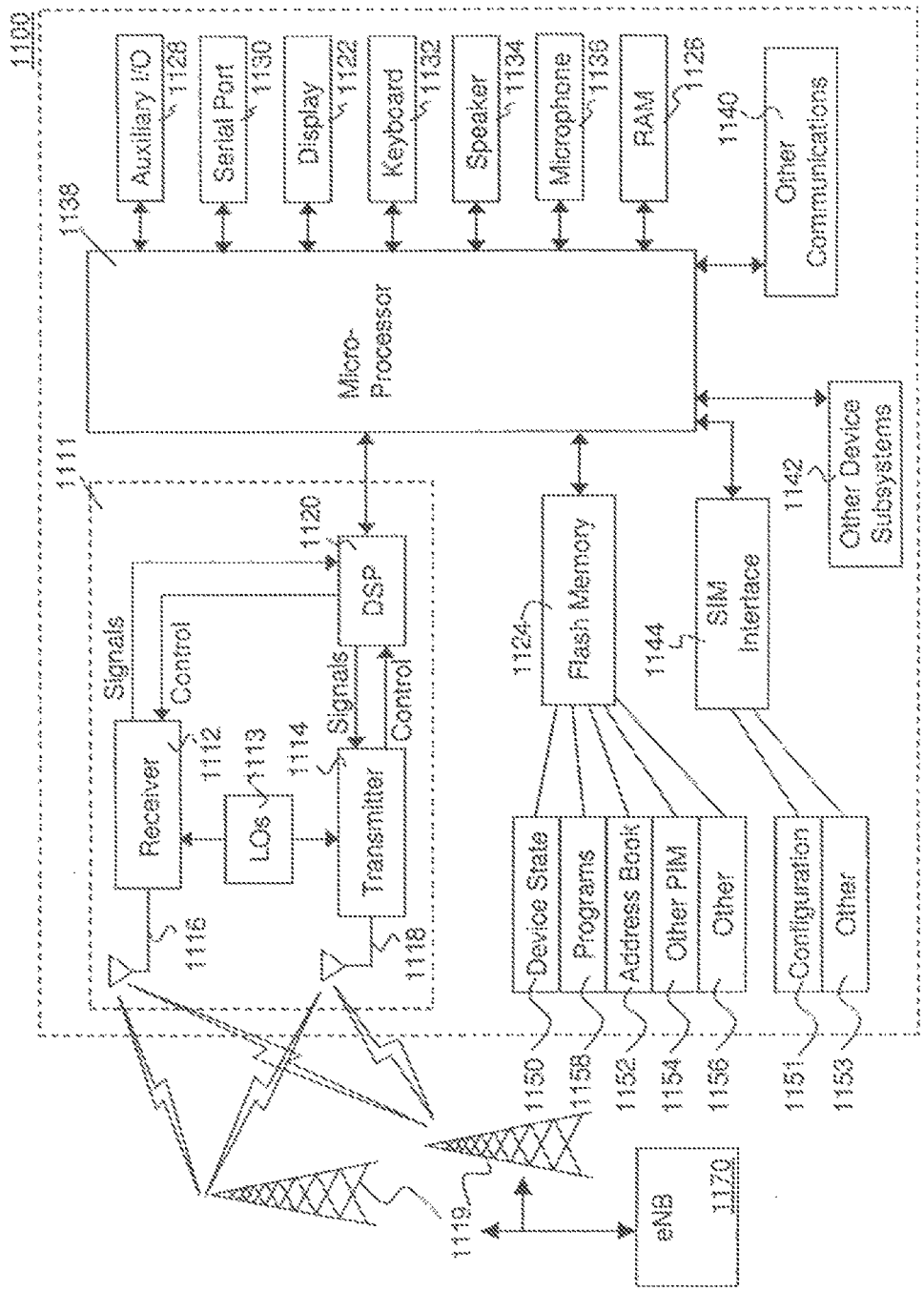
FIG. 11 is a block diagram of an exemplary user equipment.

For the UE side, FIG. 11 is a block diagram illustrating a UE capable of being used with embodiments of the apparatus and method of the present application. Mobile device 1100 is typically a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, a mobile device, or a data communication device, as examples.

Where UE 1100 is enabled for two-way communication, it will incorporate a communication subsystem 1111, including both a receiver 1112 and a transmitter 1114, as well as associated components such as one or more, typically embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate.

Network access requirements will also vary depending upon the type of network 1119. An LTE UE may require a subscriber identity module (SIM) card in order to operate on the LTE or LTE-A network. The SIM interface 1144 is normally similar to a card-slot into which a SIM card can be inserted and ejected like a diskette or PCMCIA card. The SIM card may hold key configuration 1151, and other information 1153 such as identification, and subscriber related information.

When network registration or activation procedures have been completed, UE 1100 may send and receive communication signals over the network 1119. As illustrated in FIG. 11, network 1119 can consist of multiple antennas communicating with the UE. These antennas are in turn connected to an eNB 1170.

Signals received by antenna 1116 through communication network 1119 are input to receiver 1112, which may perform such common receiver functions as signal amplification, frequency down conversion, filtering, channel selection and the like, and in the example system shown in FIG. 11, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

UE 1100 may include a microprocessor 1138 which controls the overall operation of the device. Communication functions, including data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 11 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is generally stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the UE. A predetermined set of applications that control basic operations, including at least data and voice communication applications for example, will normally be installed on UE 1100 during manufacturing. Other applications could be installed subsequently or dynamically.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application would generally have the ability to send and receive data items, via the wireless network 1119. In one embodiment, the PIM data items are seamlessly integrated, synchronized and updated, via the wireless network 1119, with the UE user's corresponding data items stored or associated with a host computer system. Further applications may also be loaded onto the UE 1100 through the network 1119, an auxiliary I/O subsystem 1128, serial port 1130, short-range communications subsystem 1140 or any other suitable subsystem 1142, and installed by a user in the RAM 1126 or a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the UE 1100.

In a data communication mode, a received signal such as a text message or web page download will be processed by the communication subsystem 1111 and input to the microprocessor 1138, which may further process the received signal for element attributes for output to the display 1122, or alternatively to an auxiliary I/O device 1128.

A user of UE 1100 may also compose data items such as email messages for example, using the keyboard 1132, which may be a complete alphanumeric keyboard or telephone-type keypad in some embodiments, in conjunction with the display 1122 and possibly an auxiliary I/O device 1128. Such composed items may then be transmitted over a communication network through the communication subsystem 1111.

For voice communications, overall operation of UE 1100 is similar, except that received signals would typically be output to a speaker 1134 and signals for transmission would be generated by a microphone 1136. Alternative voice or audio I/O subsystems, such as a voice message recording subsystem, may also be implemented on UE 1100. Although voice or audio signal output is generally accomplished primarily through the speaker 1134, display 1122 may also be used to provide an indication of the identity of a calling party, the duration of a voice call, or other voice call related information for example.

Serial port 1130 in FIG. 11 would normally be implemented in a personal digital assistant (PDA)-type UE for which synchronization with a user's desktop computer (not shown) may be desirable, but is an optional device component. Such a port 1130 would enable a user to set preferences through an external device or software application and would extend the capabilities of UE 1100 by providing for information or software downloads to UE 1100 other than through a wireless communication network. The alternate download path may for example be used to load an encryption key onto the device through a direct and thus reliable and trusted connection to thereby enable secure device communication. As will be appreciated by those skilled in the art, serial port 1130 can further be used to connect the UE to a computer to act as a modem.

Other communications subsystems 1140, such as a short-range communications subsystem, is a further component which may provide for communication between UE 1100 and different systems or devices, which need not necessarily be similar devices. For example, the subsystem 1140 may include an infrared device and associated circuits and components or a Bluetooth™ communication module to provide for communication with similarly enabled systems and devices. Subsystem 1140 may also be used for WiFi or WiMAX communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A network element of a multiple input multiple output 'MIMO' system, comprising:
   a processor; and
   a communications subsystem,
wherein the processor and the communications subsystem cooperate to execute instructions that cause transmission of downlink control information 'DCI' that contains information regarding a number of transport blocks to be utilized by a user equipment 'UE' and an index value,
   thereby, indicating to the UE a layer combination or associated combination of dedicated reference ports based on the number of transport blocks and the index value, the layer combination comprising an identity of each layer within the layer combination,
   wherein indicating to the UE a layer combination or associated combination of dedicated reference ports comprises:
   indicating a selection table based on the number of transport blocks, and
   indicating an entry from the selection table based on the index value.

2. The network element of claim 1 wherein the information and index value, which is contained in the DCI, supports multiple-user MIMO transmissions.

3. The network element of claim 1 wherein a scrambling code is associated with the index value.

4. The network element of claim 1 wherein the network element is capable of at least one of long term evolution 'LTE' operations and LTE-advanced operations.

5. A method at a network element of a multiple input multiple output (MIMO) system, comprising:
   transmitting to a user equipment 'UE' a downlink control information 'DCI' that contains information regarding a number of transport blocks to be utilized by the UE and an index value,
   thereby, indicating to the UE a layer combination or associated combination of dedicated reference ports to utilize based on the number of transport blocks and the index value, the layer combination comprising an identity of each layer within the layer combination,
   wherein indicating to the UE a layer combination or associated combination of dedicated reference ports comprises:
   indicating a selection table based on the number of transport blocks, and
   indicating an entry from the selection table based on the index value.

6. The method of claim 5 wherein the information and index value, which is contained in the DCI, supports multiple-user MIMO transmissions.

7. The method of claim 5 wherein a scrambling code is associated with the index value.

8. The method of claim 5 wherein the network element is capable of at least one of long term evolution 'LTE' operations and LTE-advanced operations.

9. A non-transitory computer-readable medium storing instructions which, when executed by a processor of a network element, cause the network element to:
   transmit to a user equipment 'UE' a downlink control information 'DCI' that contains information regarding a number of transport blocks to be utilized by the UE and an index value,
      thereby, indicating to the UE a layer combination or associated combination of dedicated reference ports based on the number of transport blocks and the index value, the layer combination comprising an identity of each layer within the layer combination,
   wherein indicating to the UE a layer combination or associated combination of dedicated reference ports comprises:
   indicating a selection table based on the number of transport blocks, and
   indicating an entry from the selection table based on the index value.

10. A method at a user equipment 'UE', comprising:
    receiving, from a network element, a downlink control information 'DCI' that contains information regarding a number of transport blocks to be utilized and an index value; and
    selecting a layer combination or associated combination of dedicated reference ports based on the number of transport blocks and the index value, the layer combination comprising an identity of each layer within the layer combination,
    wherein selecting a layer combination or associated combination of dedicated reference ports comprises:
    choosing a selection table based on the number of transport blocks; and
    selecting an entry from the selection table based on the index value.

11. The method of claim 10 wherein the information and index value, which is contained in the DCI, supports multiple-user MIMO transmissions.

12. The method of claim 10 wherein a scrambling code is associated with the index value.

13. The method of claim 10 wherein the receiving of the DCI is during at least one of long term evolution 'LTE' operations and LTE-advanced operations.

14. The method of claim 10 further comprising utilizing at least one of said transport blocks and said dedicated reference signal ports based on the information contained in the DCI.

15. A user equipment 'UE' comprising:
a processor; and
a communications subsystem,
wherein the user equipment is configured to:
receive, from a network element, a downlink control information 'DCI' that contains information regarding a number of transport blocks to be utilized and an index value; and
select a layer combination or associated combination of dedicated reference ports based on the number of transport blocks and the index value, the layer combination comprising an identity of each layer within the layer combination,
wherein the selection of a layer combination of associated combination of dedicated reference ports comprises:
choosing a selection table based on the number of transport blocks; and
selecting an entry from the selection table based on the index value.

16. The user equipment of claim 15 wherein the information and index value, which is contained in the DCI, supports multiple-user MIMO transmissions.

17. The user equipment of claim 15 wherein a scrambling code is associated with the index value.

18. The user equipment of claim 15 wherein the user equipment is configured to receive the DCI during at least one of long term evolution 'LTE' operations and LTE-advanced operations.

19. The user equipment of claim 15 wherein the user equipment is further configured to utilize at least one of said transport blocks and said dedicated reference signal ports based on the information contained in the DCI.

* * * * *

UNITED STATES PATENT AND TRADEMARK OFFICE
CERTIFICATE OF CORRECTION

PATENT NO. : 10,425,934 B2
APPLICATION NO. : 15/882570
DATED : September 24, 2019
INVENTOR(S) : Zhijun Cai et al.

Page 1 of 1

It is certified that error appears in the above-identified patent and that said Letters Patent is hereby corrected as shown below:

In the Claims

In Column 26, Line 2, Claim 5, delete "'DO'" and insert -- 'DCI' --, therefor.

Signed and Sealed this
Seventh Day of July, 2020

Andrei Iancu
*Director of the United States Patent and Trademark Office*